(12) United States Patent
Kadoya

(10) Patent No.: US 7,400,371 B2
(45) Date of Patent: Jul. 15, 2008

(54) LIQUID CRYSTAL DISPLAY HAVING PARTICULAR RETARDATION PLATE

(75) Inventor: Hidenori Kadoya, Niihama (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 411 days.

(21) Appl. No.: 11/048,171

(22) Filed: Feb. 2, 2005

(65) Prior Publication Data
US 2005/0185124 A1 Aug. 25, 2005

(30) Foreign Application Priority Data
Feb. 3, 2004 (JP) ............... P2004-026444
Apr. 22, 2004 (JP) ............... P2004-126387

(51) Int. Cl.
*G02F 1/1335* (2006.01)
*G02F 1/1343* (2006.01)

(52) U.S. Cl. .................. 349/117; 349/141

(58) Field of Classification Search ........ 349/117, 349/141
See application file for complete search history.

(56) References Cited

U.S. PATENT DOCUMENTS

| | | | |
|---|---|---|---|
| 5,056,896 A | 10/1991 | Iimura et al. | |
| 5,380,459 A | 1/1995 | Kanemoto et al. | |
| 5,472,538 A | 12/1995 | Minakuchi et al. | |
| 6,115,095 A | 9/2000 | Suzuki et al. | |
| 6,184,957 B1 * | 2/2001 | Mori et al. | 349/118 |
| 7,164,458 B2 * | 1/2007 | Itakura et al. | 349/119 |
| 2002/0149726 A1 * | 10/2002 | Yano et al. | 349/117 |
| 2004/0032547 A1 | 2/2004 | Yano et al. | |
| 2006/0164579 A1 | 7/2006 | Yano | |
| 2007/0064177 A1 | 3/2007 | Itadani et al | |

FOREIGN PATENT DOCUMENTS

| | | |
|---|---|---|
| JP | 02-160204 A | 6/1990 |
| JP | 05-117334 A | 5/1993 |
| JP | 07-230007 A | 8/1995 |
| JP | 10-54982 A | 2/1998 |
| JP | 2847187 B2 | 11/1998 |
| JP | 11-133408 A | 5/1999 |
| JP | 2000-214325 A | 8/2000 |

(Continued)

OTHER PUBLICATIONS

Takahiro Ishinabe et al., "47.2: Novel Wide Viewing Angle Polarizer with High Achromaticity", *SID 00 Digest*, 2000, pp. 1094-1097.

*Primary Examiner*—Mike Qi
(74) *Attorney, Agent, or Firm*—Sughrue Mion, PLLC

(57) ABSTRACT

A liquid crystal display comprising a liquid crystal cell having a pair of substrates and a liquid crystal layer which is sandwiched between the pair of substrates and oriented substantially in parallel with the substrates in regions near the substrates in the absence of an applied voltage, a first polarizing plate arranged outside one of the substrates of the liquid crystal cell, a second polarizing plate arranged outside the other of the substrates of the liquid crystal cell, and at least one retardation plate placed between either one of the substrates and the polarizing plate arranged outside the substrate, in which at least one retardation plate has a negative uniaxiality and an optical axis in a plane direction thereof, and a Nz coefficient is from −1.0 to +0.2.

24 Claims, 12 Drawing Sheets

FOREIGN PATENT DOCUMENTS

| | | |
|---|---|---|
| JP | 3097855 B2 | 8/2000 |
| JP | 3118208 B2 | 10/2000 |
| JP | 2002-55341 | 2/2002 |
| JP | 2002-258041 A | 9/2002 |
| JP | 2003-207620 A | 7/2003 |
| JP | 2004-004642 | 1/2004 |
| JP | 2004-157523 | 6/2004 |
| WO | WO 2005/050301 A1 | 6/2005 |

* cited by examiner

Fig. 1
PRIOR ART
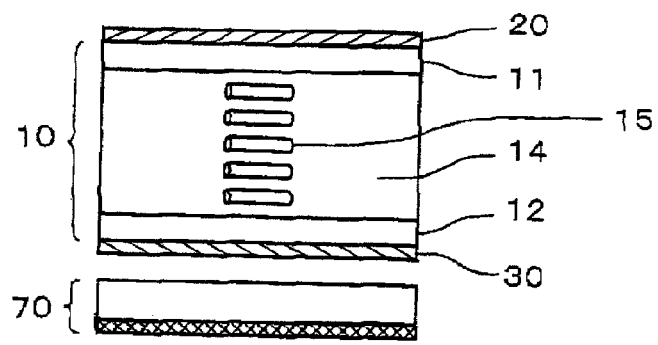
Fig. 2A PRIOR ART
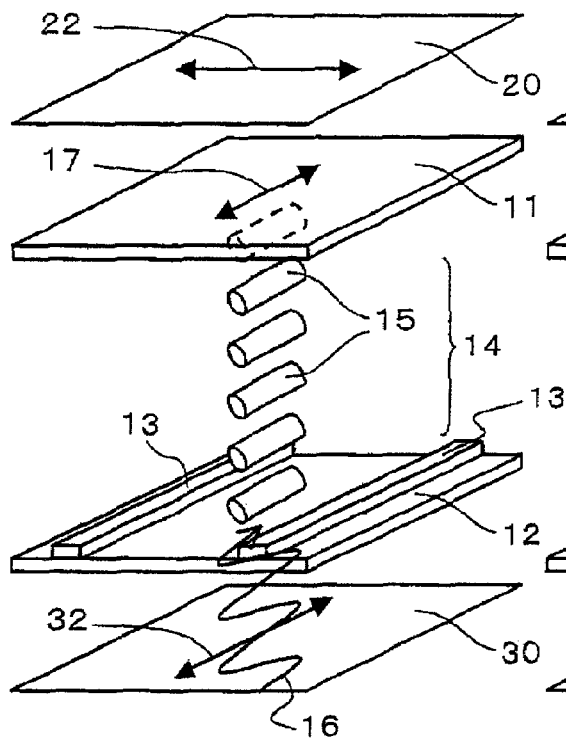
Fig. 2B PRIOR ART
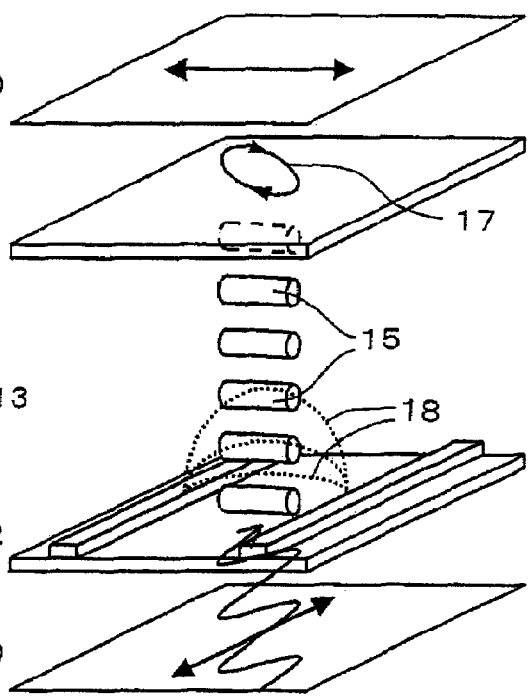

LIQUID CRYSTAL DISPLAY HAVING PARTICULAR RETARDATION PLATE

FIELD OF THE INVENTION

The present invention relates to a liquid crystal display which achieves wide viewing angles.

PRIOR ART

In these years, liquid crystal displays (LCDs) have been increasingly used as information-displaying devices of mobile phones, personal digital assistants (PDAs), personal computers, televisions, etc., since LCDs have various advantages such as low electric power consumption, low voltage operation, lightweight, slimness and so on. With the progress of LCD technologies, many LCDs with various modes have been proposed, and thus problems associated with LCDs such as a response speed, contrast, a narrow angle of view, etc. are being solved. However, the angle of view of LCDs is still narrower than that of cathode ray tubes (CRTs) and many measures are proposed to compensate an angle of view of LCDs.

As one of such measures for compensating an angle of view, liquid crystal cells which can essentially enlarge the angle of view are proposed. Examples of such cells are liquid crystal cells of an optically compensated bend (OCB) mode, a vertical alignment (VA) mode, an in-plane switching (IPS) mode, etc.

A conventional liquid crystal cell of a twisted nematic (TN) mode changes the orientation state of liquid crystal molecules with a vertical electric field by applying an electric field in a direction vertical to a substrate plane, while the liquid crystal cell of the IPS mode changes the orientation state of liquid crystal molecules with an in-plane electric filed by applying an electric field in a direction in parallel with a substrate plane. In the case of the IPS mode, the liquid crystal molecules are oriented in parallel with the substrate plane in the absence of any applied electric field, and the molecules are aligned substantially in the same direction unlike the TN mode in which the molecules are twisted.

Here, the principle of the IPS mode is explained by making reference to FIGS. 1 and 2.

FIG. 1 is a schematic cross section of a liquid crystal display of the IPS mode, and FIG. 2 includes schematic perspective views depicting the example of normally black, in which FIG. 2A shows a state with no applied voltage, while FIG. 2B shows a state with an applied voltage. In FIGS. 2A and 2B, the layers are depicted in separated states for easy understanding of the figures. In FIG. 2B, only the elements which are in the different states from those of FIG. 2A have reference numerals, while the elements which are in the same states as those of FIG. 2A have no reference numerals to avoid the complication of the figure.

With making reference to FIG. 1, the liquid crystal cell 10, which is the main element of the liquid crystal display of FIG. 1, has the liquid crystal layer 14 which is sandwiched between the upper and lower cell substrates 11, 12. The liquid crystal molecules 15 are oriented substantially in parallel with the planes of the cell substrates 11, 12. The polarizing plates 20, 30 are arranged on the upper and lower sides of the liquid crystal cells, respectively. Among light beams from the backlight source 70, which is placed on the outer side of one of the polarizing plates, for example, the polarizing plate 30 in FIG. 1, only the linear polarized light in parallel with the transmission axis of the polarizing plate 30, which is present between the liquid crystal cell 10 and the backlight source 70, comes into the liquid crystal cell 10.

In the state of FIG. 2A where no voltage is applied, the liquid crystal molecules 15 are oriented substantially in the same direction and in the direction in parallel with the substrate planes. Furthermore, in the state of FIG. 2A, the liquid crystal molecules 15 are oriented substantially in parallel with the transmission axis 32 of the polarizing plate 30 on the rear side. On one of the substrates, for example, the lower substrate 12 in FIG. 2A, the electrodes 13, 13 are provided in the comb teeth form. In such a state, the linear polarized light 16, which has passed through the polarizing plate 30 on the rear side, passes through the liquid crystal layer 14 without any change of the polarization state and then through the upper substrate 11 in the state of the linear polarized light 17 having same polarized direction as that when coming into the liquid crystal layer 14. When the transmission axis 22 of the polarizing plate 20 placed on the substrate 11 is at right angles to the transmission axis 32 of the polarizing plate 30 on the rear side, the linear polarized light 17 which has passed through the upper substrate cannot pass through the polarizing plate 22 on the front side. Thus, the liquid crystal cell displays a black state.

On the other hand, when the electric field 18 is applied between the electrodes 13, 13 arranged in parallel with the substrate plane along the dotted lines as shown in FIG. 2B, the major axes of the liquid crystal molecules 15 are aligned along the electric field 18 so that the liquid crystal molecules become out of alignment with the transmission axis 32 of the polarizing plate 30 on the rear side. As a result, the polarized state of the incident linear polarized light 16 is changed while it passes through the liquid crystal layer 14 so that the polarized light turns into the elliptically polarized light 17 after passing through the liquid crystal layer 14, and thus a component which can pass through the transmission axis 22 of the polarizing plate 20 on the front side. Consequently, the liquid crystal cell displays a light state.

In FIG. 2, the transmission axis 32 of the polarizing plate 30 on the rear side is substantially in parallel with the major axes of the liquid crystal molecules 15, and the transmission axes of the polarizing plate 20 on the front side and the polarizing plate 30 on the rear side are at right angles to each other. The same effects as those of the liquid crystal display of FIG. 2 can be achieved when the transmission axis 22 of the polarizing plate 20 is substantially in parallel with the major axes of the liquid crystal molecules 15, and the transmission axes of the polarizing plate 20 on the front side and the polarizing plate 30 on the rear side are at right angles to each other. The point is that the major axes of the liquid crystal molecules 15 are substantially in parallel with the transmission axis of either one of the polarizing plates. In this case, the major axes of the liquid crystal molecules may not be exactly in parallel with the transmission axis of either one of the polarizing plates. Rather, the axes of the liquid crystal molecules may be shifted from the direction of the transmission axis of the polarizing plate at a certain angle, for example, about 10 degrees or less, so that the liquid crystal molecules 15 can rotate in the same direction when the electric field 18 is applied. Often, the transmission axes of the polarizing plates 20, 30 are at right angles to each other so that the liquid crystal display is in the black state when the electric filed is not applied, while it is in the light state when the electric field is applied, that is, the liquid crystal display is in the normally black state. When the transmission axes of the polarizing plates 20, 30 are in parallel with each other, the liquid crystal display is in the light state when the electric filed is not applied, while it is in the black state when the electric field is applied, that is, the liquid crystal display is in the normally white state.

Since the liquid crystal molecules are oriented in parallel with the substrate planes and also in the same direction in the IPS mode as described above, the IPS mode has better viewing angle characteristics than other modes. However, various liquid crystal displays with the improved angle of view including one with the IPS mode still have the dependency on viewing angles. The dependency of the liquid crystal display on viewing angles will be explained by making reference to the IPS mode as an example using FIG. 3.

FIG. 3 schematically shows the relationship of the direction of the transmission axes of the upper and lower polarizing plates with the direction of the major axis of the liquid crystal molecule in the case of the black-displaying state of the IPS mode. FIG. 3A shows the state being viewed from the normal line direction to the cell substrate, while FIG. 3B shows the state being viewed from the oblique direction from the normal line to the cell substrate. When being view from the normal line direction to the cell substrate as shown in FIG. 3A, the transmission axis 32 of the polarizing plate 30 on the rear side and the transmission axis 22 of the polarizing plate 20 on the front (observation) side are at right angles to each other. In this case, the major axis of the liquid crystal molecule 15 is substantially in the sane direction as the transmission axis 32 of the polarizing plate 30 in the rear side. When being viewed from the oblique direction from the normal line to the cell substrate, that is, being viewed from tho direction shown by the arrow V in FIG. 3A, the transmission axes 22, 32 of the polarizing plates 20, 30 are not at right angles with each other, and the light leakage 35 in the direction indicated by the white arrow is generated.

To compensate the dependency of the polarizing plate on viewing angles, various measures are proposed. One effective measure is a method for compensating the angle of view of the polarizing plate by a retardation plate. For example, JP-A-02-160204 discloses a retardation film in which a ratio of retardation when light beams come into the film from the normal line direction to that when light beams come into the film from a direction deviating by 40 degrees from the normal line is within a specific range, for example; a retardation film oriented in the thickness direction. JP-A-07-230007 discloses a retardation film having the controlled dependency of retardation on viewing angles comprising a uniaxially stretched thermoplastic resin film which is thermally shrunk in a specific state, for example, a retardation film oriented also in the thickness direction. It is effective for compensating the angle of view that such a retardation film oriented in the thickness direction is interposed between the liquid crystal cell substrate and one of the two polarizing plates between which the liquid crystal cell is sandwiched so that the transmission axis of the polarizing plate and the retarded phase axis of the adjacent retardation plate are in parallel with each other.

T. Ishinabe et al., "Novel Wide Viewing Angle Polarizer with High Achromaticity", SID 00 DIGEST, 2000, p 1094-1094 describes that a polarizing plate oriented in the thickness direction is more effective when the Nz coefficient of the plate represented by $(n_x-n_z)/(n_x-n_y)$ is 0.25 and 0.8 where $n_x$ is a refractive index of the retardation plate in a retarded phase axis direction in the plane of the retardation plate, $n_y$ is a refractive index of the retardation plate in a direction perpendicular to the retarded phase axis direction in the plane of the retardation plate and $n_z$ is a refractive index in the thickness direction of the retardation plate. Furthermore, JP-A-11-133408 discloses the insertion of a retardation film (compensation layer) having a positive uniaxiality and an optical axis in the direction perpendicular to the substrate plane, that is, the retardation film uniaxially oriented in the thickness direction, between a liquid crystal cell substrate and a polarizing plate in the case of an IPS mode.

However, the retardation plates oriented in the thickness direction have low productivity and are expensive, since they should be precisely processed. Furthermore, the kinds of resins to be oriented in the thickness direction are limited. Among such resins, only polycarbonate resin is mass produced currently. Therefore, such retardation plates are not necessarily satisfactory in applications requiring photoelasticity, that is, a small photoelasticity constant.

In connection with the IPS mode, JP-A-10-54982 describes that the viewing angle dependency is improved by placing a retardation plate having negative uniaxiality (an optical compensation sheet) between a liquid crystal cell substrate and one of polarizing plates. This patent application describes an example in which the retardation plate having the negative uniaxiality is arranged such that the optical axis of the retardation plate, that is, an advanced phase axis, is in parallel with the major axes of the liquid crystal molecules.

On the other hand, various proposals have been made on the materials of retardation plates. For example, JP-A-2000-214325 discloses a retardation plate made of a copolymer of a N-alkylmaleimide and an α-olefin. Other maleimide base copolymers are also known. For example, JP-A-05-117334 describes that a copolymer of N-phenyimaleimide, a N-alkylmaleimide and an α-olefin is useful as a material of optical lenses, optical fibers, substrates of optical discs, etc. JP-A-2003-207620 discloses a retardation plate comprising a terpolymer of an acyclic olefinic monomer, a cyclic olefinic monomer and an aromatic vinyl monomer.

SUMMARY OF THE INVENTION

One object of the present invention is to provide a liquid crystal display comprising a retardation plate and having improved viewing angle characteristics.

Another object of the present invention is to provide a liquid crystal display which can be easily produced and has improved viewing angle characteristics.

Accordingly, the present invention provides a liquid crystal display comprising:

a liquid crystal cell comprising a pair of substrates and a liquid crystal layer which is sandwiched between said pair of substrates and oriented substantially in parallel with said substrates in regions near said substrates in the absence of an applied voltage, a first polarizing plate arranged outside one of said substrates of the liquid crystal cell, a second polarizing plate arranged outside the other of said substrates of the liquid crystal cell, and at least one retardation plate placed between either one of said substrates and said polarizing plate arranged outside said substrate, wherein said at least one retardation plate has a negative uniaxiality and an optical axis in a plane direction thereof, and wherein a Nz coefficient represented by $(n_x-n_z)/(n_x-n_y)$ is from −1.0 to +0.2 where $n_x$ is a refractive index of the retardation plate in a retarded phase axis direction in the plane of the retardation plate, $n_y$ is a refractive index of the retardation plate in a direction perpendicular to the retarded phase axis direction in the plane of the retardation plate and $n_z$ is a refractive index in a thickness direction of the retardation plate.

In the liquid crystal display of the present invention, preferably, a pair of the polarizing plates are arranged with their transmission axes being at right angles to each other so that the display is in the state of normal black.

In one preferred embodiment, the polarizing plate comprises a uniaxially stretched film of a polymer having a specific negative birefringence, or has a layer of a liquid crystal discotic compound exhibiting a negative uniaxiality.

Preferably, the liquid crystal display of the present invention operates in an in-plane switching (IPS) mode.

BRIEF DESCRIPTION OF THE DRAWINGS

FIG. 1 is a schematic cross section of a liquid crystal display which operates in an IPS mode.

FIG. 2 explains the principle of the IPS mode, and FIG. 2A shows a state with no applied voltage, while FIG. 2B shows a state with an applied voltage.

FIG. 3 schematically shows the relationship of the direction of transmission axes of upper and lower polarizing plates with the direction of the major axis of liquid crystal molecule in the case of the black-displaying state of the IPS mode, and FIG. 3A shows the state being viewed from the normal line direction to the cell substrate, while

FIG. 4 shows an example of a liquid crystal display of the present invention comprising only one retardation plate.

FIG. 5 shows a retardation plate having the negative uniaxiality and an optical axis in the plane direction by way of a refractive index ellipsoid, and FIG. 5A illustrates the refractive index ellipsoid with the retarded phase axis being in the lateral direction, while

FIG. 6 shows an example of a liquid crystal display of the present invention comprising two retardation plates.

DETAILED DESCRIPTION OF THE INVENTION

In the first preferred embodiment of the liquid crystal display according to the present invention, the liquid crystal display has a single retardation plate. This embodiment will be explained by making reference to the accompanying drawings.

Figure 3A:
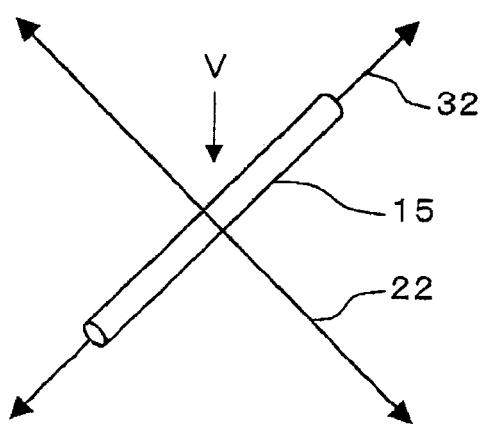
Figure 3B:
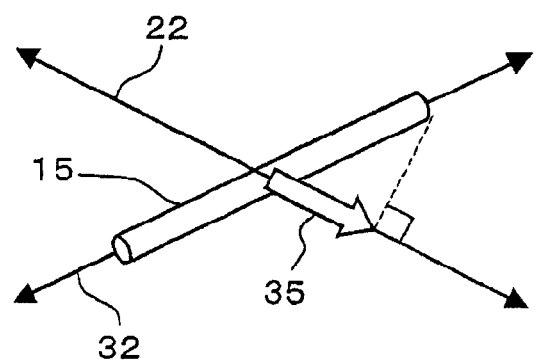
FIG. 3B shows the state being viewed from the oblique direction from the normal line to the cell substrate.
Figure 4A:
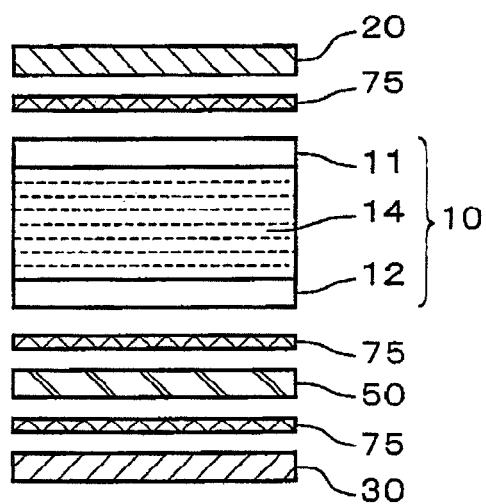
FIG. 4A is a schematic cross section of such a liquid crystal display.
Figure 4B:
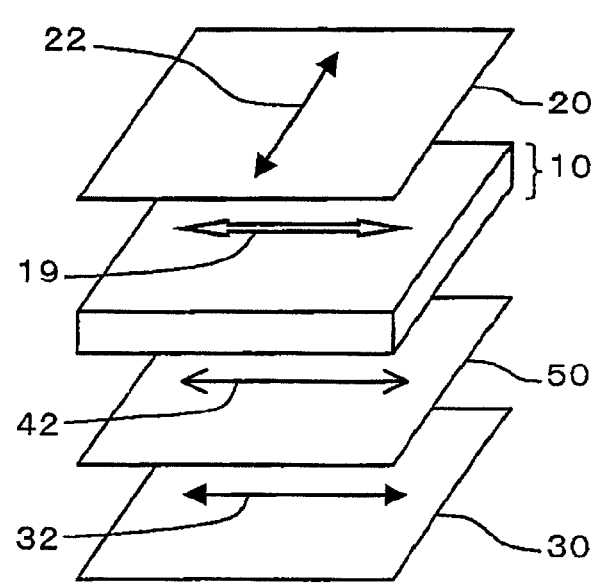
FIG. 4B is a schematic perspective view showing the relationship of the axes of various elements of the liquid crystal display of FIG. 4A.

FIG. 4 shows a liquid crystal display of the present invention comprising only one retardation plate. FIG. 4A is a schematic cross section of such a liquid crystal display, and FIG. 4B is a schematic perspective view showing the relationship of the axes of various elements of the liquid crystal display of FIG. 4A. In FIG. 4, the liquid crystal display comprises the liquid crystal cell 10, which comprises a pair of the substrates 11, 12 and the liquid crystal layer 14 sandwiched between the substrates 11, 12. The first polarizing plate 20 is arranged outside the substrate 11, while the second polarizing plate 30 is arranged outside the other substrate 12. The first and second polarizing plates 20, 30 are generally arranged such that the transmission axis 22 of the former and the transmission axis 32 of the latter are substantially at right angles to each other as shown in FIG. 4B, and thus the liquid crystal display is made normally black. Alternatively, the transmission axes of the polarizing plates may be substantially in parallel with each other. In this case, the liquid crystal display is made normally white. Furthermore, when no electric field is applied, the transmission axis 22 of the polarizing plate 20 is substantially at right angles to the major axis direction 19 of the liquid crystal molecules 15 in the liquid crystal layer 14, while the transmission axis 32 of the polarizing plate 30 is substantially in parallel with the major axis direction 19 of the liquid crystal molecules 15.

Herein, the terms "substantially at right angles" and "substantially in parallel" are intended to mean that the relationship of the axes may deviate from the right angle position or the parallel position by up to about 10 degrees.

Hereinafter, the orientation of the liquid crystal molecules is sometimes explained without making reference to "the absence of an applied voltage", and the major axis of the liquid crystal molecules always means a direction in which the liquid crystal molecules are oriented in the absence of an applied voltage.

In this first embodiment, one retardation plate 50 is placed between the liquid crystal cell 10 and the polarizing plate 30 having the transmission axis which is substantially in parallel with the orientation direction 19 of the liquid crystal molecules (i.e. the direction of the major axes of the liquid crystal molecules) contained in the liquid crystal layer 14 constituting the liquid crystal cell 10 (see FIGS. 4B). The retardation plate 50 has the negative uniaxiality, and its optical axis is in the plane direction. The retarded phase axis 42 of the retardation plate 40 is substantially in parallel with the transmission axis 32 of the second polarizing plate 30. The retardation plate 50 functions also as an optical compensation plate. In this embodiment, no retardation plate is placed between the other polarizing plate 20 and the liquid crystal cell 10. A backlight (not shown in FIGS. 4A and 4B) is provided on the rear side of either the polarizing plate 20 or 30, and functions as a light source for illuminating the liquid crystal cell. The backlight may be provided on either side.

Figure 5A:
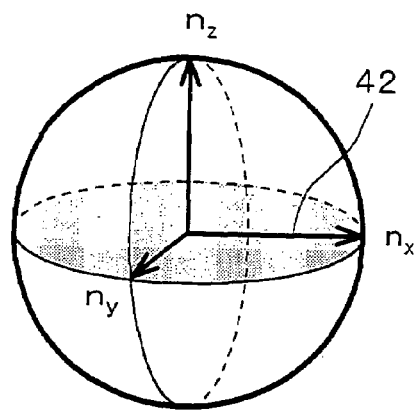
Figure 5B:
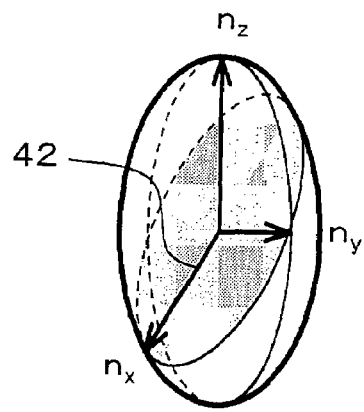
FIG. 5B illustrates the refractive index ellipsoid with the advanced phase axis being in the lateral direction.

The polarizing plate 20 has three refractive indices $n_x$, $n_y$, and $n_z$ in the three axis directions, respectively. The indices $n_x$, $n_y$ and $n_z$ are refractive index in the retarded phase axis direction 42 in the plane, one in the advanced phase axis direction (a direction perpendicular to the retarded phase axis in the plane), and one in the thickness direction, respectively. FIG. 5 illustrates a retardation plate having the negative uniaxiality and an optical axis in the plane direction by way of a refractive index ellipsoid. FIG. 5A illustrates the refractive index ellipsoid with the retarded phase axis 42 being in the lateral direction, while FIG. 5B illustrates the refractive index ellipsoid with the advanced phase axis, that is, the direction perpendicular to the retarded phase axis, being in the lateral direction. The retardation plate having the negative uniaxiality and the optical axis in the plane direction means a retardation plate having the refractive indices which have the following relationship:

$$n_x \approx n_z > n_y$$

The direction having the smallest refractive index $n_y$ (i.e. the advanced phase axis direction) is the optical axis.

As one of the characteristics of the retardation plate 50, an in-plane retardation value expressed by the formula:

$$(n_x - n_y) \times d$$

wherein d is a thickness of the retardation plate is preferably from 80 nm to 250 nm, more preferably from 100 nm to 210 nm, particularly from 120 nm to 160 nm. Another characteristic of the retardation plate 50 is a Nz coefficient expressed by the formula: $(n_x - n_z)/(n_x - n_y)$, and the Nz coefficient is preferably from −0.1 to +0.2, more preferably from −0.2 to +0.2. A particularly preferable retardation plate is a negative uniaxial retardation plate which is produced by uniaxially stretching a polymer having a specific negative birefringence and has a Nz coefficient of about 0 (zero), or a retardation plate having a layer of a liquid crystal discotic compound exhibiting the negative uniaxiality.

In the second preferred embodiment of the liquid crystal display according to the present invention, the liquid crystal display has two retardation plates. This embodiment will be explained by making reference to the accompanying drawings.

Figure 6A:
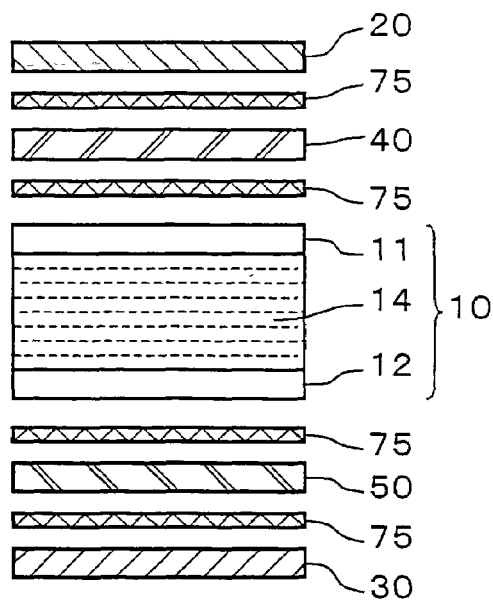
FIG. 6A is a schematic cross section of such a liquid crystal display.
Figure 6B:
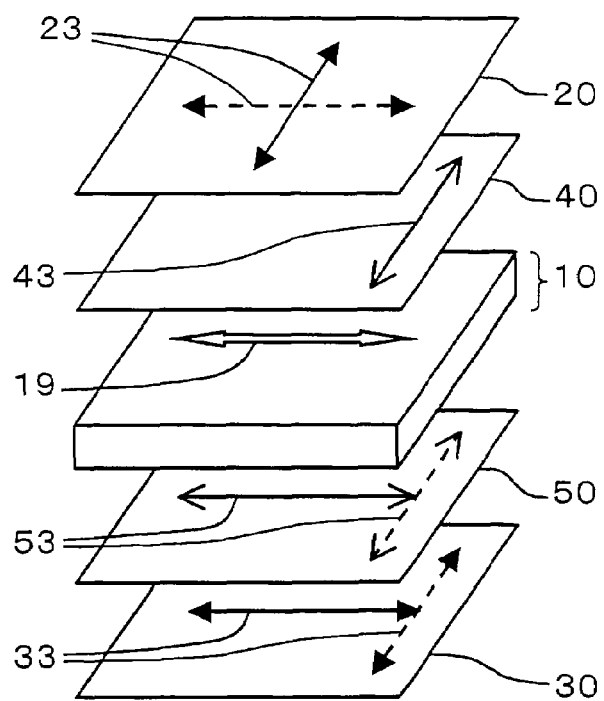
FIG. 6B is a schematic perspective view showing the relationship of the axes of various elements of the liquid crystal display of FIG. 6A.

FIG. 6 shows a liquid crystal display of the present invention comprising two retardation plates. FIG. 6A is a schematic cross section of such a liquid crystal display, and FIG. 6B is a schematic perspective view showing the relationship of the axes of various elements of the liquid crystal display of FIG. 6A. In FIG. 6, the liquid crystal display comprises the liquid crystal cell 10, which comprises a pair of the substrates 11, 12 and the liquid crystal layer 14 sandwiched between the substrates 11, 12. The first polarizing plate 20 is arranged outside the substrate 11, while the second polarizing plate 30 is arranged outside the other substrate 12. The first and second polarizing plates 20, 30 are generally arranged such that the absorption axis 23 of the former and the absorption axis 33 of the latter are substantially at right angles to each other, and thus the crystal display is made normally black. Alternatively, the transmission axes of the polarizing plates may be substantially in parallel with each other. In this case, the liquid crystal display is made normally white. Furthermore, when no electric field is applied, the absorption axis 23 of the polarizing plate 20 is substantially at right angles to the major axis direction 19 of the liquid crystal molecules 15 in the liquid crystal display 14, while the absorption axis 33 of the polarizing plate 30 is substantially in parallel with the major axis direction 19 of the liquid crystal molecules 15.

In FIG. 6B, the absorption axis 23 is indicated by a solid line arrow and a broken line arrow, which are at right angles, on the first polarizing plate 20, while the absorption axis 33 is also indicated by a solid line arrow and a broken line arrow, which are at right angles, on the second polarizing plate 30. The arrows mean that the polarizing plates are generally arranged with the combination of the solid line arrows or the broken line arrows. An absorption axis of a polarizing plate is at right angles to a transmission axis in the plane of the plate.

The polarizing plate used in the first and second embodiments of the liquid crystal display according to the present invention may be a conventional linear polarizing plate, which allows linear polarized light oscillating in one direction in the plane to pass through the plate, and absorbs linear polarized light oscillating in a direction perpendicular to the one direction in the plane. Specific examples of the polarizing plate include an iodine-based polarizing plate comprising a polyvinyl alcohol film in which iodine molecules are absorbed and oriented, and a dye-based polarizing plate comprising a polyvinyl alcohol film in which the molecules of a dichromatic dye are absorbed and oriented. Such a polarizing plate usually has a protective film of a polymer on one or both of the surfaces of the plate.

In the second embodiment, the first retardation plate 40 having the retarded phase axis 43, which is substantially at right angles to the orientation direction 19 of the liquid crystal molecules (i.e. the direction of the major axes of the liquid crystal molecules), is placed between the liquid crystal cell 10 and the polarizing plate 20. The second retardation plate 50 is placed between the liquid crystal cell 10 and the polarizing plate 30.

Preferably, the first retardation plate has an in-plane retardation value of 160 to 270 nm, while the second retardation plate has an in-plane retardation value of 100 to 160 nm.

In the second embodiment, the liquid crystal display of the present invention is characterized in that two retardation plates having different in-plane retardation values are provided, and the first retardation plate 40 having the larger retardation value has a retarded phase axis in perpendicular to the major axis direction 19 of the liquid crystal molecules. Such an arrangement of the retardation plates can highly compensate the retardation by the liquid crystal layer and the polarizing plates. When the retardation values of the first and second retardation plates are outside the above ranges, the viewing angle dependency increases.

The retardation plates 40, 50 preferably have a Nz coefficient of −0.1 to +0.2, more preferably from −0.5 to +0.1.

The second retardation plate 50 having the smaller retardation value is preferably arranged such that its retarded phase axis 53 is substantially at right angles to or in parallel with the major axis direction 19 of the liquid crystal molecules. In FIG. 6B, the retarded phase axis 53 is indicated by the solid line arrow and the broken line arrow which are at right angles to each other. Preferably, the retarded phase axis 53 is in the direction indicated by either the solid line arrow or the broken line arrow. More preferably, the second retardation plate 50 and the liquid crystal cell 10 are arranged such that the retarded phase axis 53 of the former is substantially in parallel with the major axis direction 19 of the liquid crystal molecules, that is, in the direction indicated by the solid line arrow shown in FIG. 6B.

Preferably, the first retardation plate 40 having the larger in-plane retardation value is arranged such that its retarded phase axis 43 is substantially at right angles to or in parallel with the absorption axis 23 of the polarizing plate 20 which is adjacent to the retardation plate 40. In FIG. 6B, the absorption axis 23 is indicated by the solid line arrow and the broken line arrow on the first polarizing plate 20. Thus, the first retardation plate 40 is preferably arranged so that its retarded phase axis 43 is in the same direction as that of either the solid line arrow or the broken line arrow. In particular, the first retardation plate 40 is preferably arranged such that its retarded phase axis 43 is substantially in parallel with the absorption axis 23 of the polarizing plate 20, that is, the absorption axis 23 of the first polarizing plate 20 is in the direction of the solid line arrow shown in FIG. 6B.

Preferably, the second retardation plate 50 having the smaller in-plane retardation value is arranged such that its retarded phase axis 53 is substantially at right angles to or in parallel with the absorption axis 33 of the polarizing plate 30 which is adjacent to the retardation plate 50. In particular, the second retardation plate 50 is preferably arranged such that its retarded phase axis 53 is substantially in parallel with the absorption axis 33 of the polarizing plate 30.

The retardation plates 40, 50 function also as optical compensation plates. A backlight (not shown in FIGS. 6A and 6B) is provided on the rear side of either the polarizing plate 20 or 30, and functions as a light source for illuminating the liquid crystal cell 10. The backlight may be provided on either side.

In the second embodiment, preferably, the retardation plate is one having the negative uniaxiality in which the three refractive indices $n_x$, $n_y$ and $n_z$ have the relationship: $n_x \approx n_z > n_y$, or one having the largest refractive index in the thickness direction in which the three refractive indices have the relationship: $n_z > n_x > n_y$. Such a retardation plate can be produced by stretching a polymer having a specific negative birefringence, or by forming a layer of a liquid crystal discotic compound oriented in a specific direction. For example, when a film of a polymer having a specific negative birefringence is uniaxially stretched in a machine direction preferably with leaving the film edges free, a retardation plate having the negative uniaxiality, which has the relationship: $n_x \approx n_z > n_y$ and a Nz coefficient of substantially 0 (zero), is produced. When a film of a polymer having a specific negative birefringence is uniaxially stretched in a transverse direction preferably with fixing the film edges with a tenter, etc., a retardation plate, which satisfies the relationship: $n_z > n_x > n_y$, and a negative Nz coefficient, is produced. When a layer of a liquid crystal discotic compound is formed on a polymer film such that the disc planes of the compound are oriented in a direction perpendicular to the substrate surface, a retardation plate, which has the relationship: $n_x \approx n_z > n_y$, is produced. When the stretching condition or the orientation direction of the discotic compound is suitably selected, a retardation plate having a Nz coefficient slightly larger than 0 (zero), that is, having a relationship: $n_x > n_z$ may be produced. When the retardation plate is produced by such methods, its Nz coefficient can be adjusted in a range of −1 to +0.2. When a retardation plate having the relationship: $n_z > n_x > n_y$ is produced, preferably the Nz coefficient is adjusted in a range of about −0.5 to about 0.0.

With the retardation plate satisfying the refractive index relationship: $n_x \approx n_z > n_y$, or $n_z > n_x > n_y$, a refractive index ellipsoid is substantially the same as that of FIG. 5.

Preferred but non-limiting examples of the polymer having the specific negative birefringence, which is used to produce the retardation plate used in the present invention by the uniaxial stretching in the machine or transverse direction, include styrene polymers, acrylate polymers, methacrylate polymers, acrylonitrile polymers, metacrylonitrile polymers, vinylnaphthalene polymers, vinylpyridine polymers, vinylcarbazole polymer, phenylacrylamide polymers, vinylbiphenyl polymers, vinylanthracene polymers, acenaphthylene polymers, phenylcarbonyloxynorbornene polymers, biphenylcarbonyloxynorbornene polymers, naphthylcarbonyloxynorbornene polymers, anthracenylcarbonyloxynorbornene polymers, phenylcarbonyloxytetracyclo[4.4.0.1$^{2,5}$.1$^{7,10}$]-3-dodecene polymers, biphenylcarbonyloxytetracyclo[4.4.0.1$^{2,5}$.1$^{7,10}$]-3-dodecene polymers, naphthylcarbonyloxy-tetracyclo[4.4.0.1$^{2,5}$.1$^{7,10}$]-3-dodecene polymers, anthracenylcarbonyloxytetracyclo [4.4.0.1$^{2,5}$.1$^{7,10}$]-3-dodecene polymers, α-olefin/N-phenylmaleimide copolymers, etc. Here, "tetracyclo[4.4.0.1$^{2,5}$.1$^{7,10}$]-3-dodecene" is represented by the following formula and may also be named dimethanooctahydronaphthalene:

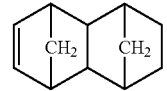

The above polymers may be blended with other polymers or the monomers constituting the above polymers may be copolymerized with other monomers, to an extent that the specific negative birefringence is not impaired. Thereby, some functions such as a higher glass transition temperature, a low photoelasticity, etc. can be imparted to the above polymers.

Preferably, the polymer used for the production of the retardation plate has a photoelasticity coefficient of 10×10$^{-5}$ mm$^2$/kg or less. The photoelasticity means a phenomenon that when an internal stress is induced in an isotropic material by the application of an external force, the isotropic material exhibits an optical anisotropy and thus birefringence. When a stress exerted on a material per unit area is "s" and a birefringence is "Δn", theoretically, the stress s and the birefringence Δn have a proportional relationship expressed by Δn=Cs. The coefficient C is a photoelasticity coefficient. In other words, when a stress s is recorded in the direction of an abscissa, while a birefringence Δn induced by the application of the stress s is recorded in the direction of an ordinate, the relationship between the stress and birefringence is expressed by a straight line. The gradient of this straight line is a photoelasticity coefficient.

Such polymers preferably have a glass transition temperature of at least 120° C., more preferably at least 130° C., and heat resistance from the viewpoint of use environment. Polymers having a high glass transition temperature and heat resistance are usually prepared by copolymerization.

In view of the photoelasticity coefficient and the glass transition temperature, a preferable example of the polymer having the specific negative birefringence is a terpolymer comprising at least one acyclic olefinic monomer selected from the group consisting of ethylene and α-olefins having 3 to 20 carbon atoms, at least one cyclic olefinic monomer and at least one aromatic vinyl monomer.

Monomers constituting such a terpolymer will be explained. The acyclic olefinic monomer is selected from the group consisting of ethylene and α-olefins having 3 to 20 carbon atoms. Examples of the α-olefins having 3 to 20 carbon atoms include linear α-olefins having 3 to 20 carbon atoms such as propylene, 1-butene, 1-pentene, 1-hexene, 1-octene, 1-decene, 1-dodecene, 1-tetradecene, 1-hexadecene, 1-octadecene, 1-eicosene, etc.; and branched α-olefins having 4 to 20 carbon atoms such as 4-methyl-1-pentene, 3-methyl-1-pentene, 3-methyl-1-butene, etc. Among them, ethylene, propylene and 1-butene are preferable from the viewpoint of the flexibility of the film of the terpolymer. In particular, ethylene is preferable. Ethylene and the α-olefins having 3 to 20 carbon atoms may be used independently or in admixture of two or more of them.

The cyclic olefinic monomer is a compound having a polymerizable carbon-carbon double bond in a carbon ring, which can introduce an alicyclic group such as a cyclobutane ring, a cyclopentane ring, a cyclohexane ring or a fused ring structure of those rings into the backbone of the terpolymer. Specific examples of the cyclic olefinic monomer include bicyclo[2.2.1]hept-2-ene (also referred to as "norbornene") and derivatives of norbornene having at least one alkyl group having 1 to 4 carbon atoms (e.g. methyl, ethyl, propyl, butyl) as a substituent such as 6-alkylbicyclo[2.2.1]hept-2-ene, 5,6-dialkylbicyclo-[2.2.1]hept-2-ene, 1-alkylbicyclo[2.2.1]-hept-2-ene, 7-alkylbicyclo[2.2.1]hept-2-ene, etc.; tetracyclo-[4.4.0.1$^{2,5}$.1$^{7,10}$]-3-dodecene (also referred to as dimethanooctahydronaphthalene) and derivatives of dimethanooctahydronaphthalene having at least one alkyl group having 3 or more carbon atoms as a substituent at the 8- and/or 9-positions thereof such as 8-alkyltetracyclo[4.4.0.1$^{2,5}$.1$^{7,10}$]-3-dodecene, 8,9-dialkyltetracyclo[4.4.0.1$^{2,5}$.1$^{7,10}$]-3-dodecene, etc.; halogenated derivatives of norbornene in which at least one halogen atom is introduced per molecule; halogenated derivatives of dimethanooctahydronaphthalene in which at least a halogen atom is introduced to the 8- and/or 9-positions thereof; and the like. These cyclic olefins may be used independently or in admixture of two or more of them.

The aromatic vinyl monomer includes styrene and its derivatives. The derivatives of styrene are styrene having other group bonded to the styrene ring. Examples of the derivatives of styrene include alkylstyrenes such as o-methylstyrene, m-methylstyrene, p-methylstyrene, 2,4-dimethylstyrene, o-ethylstyrene, p-ethylstyrene, etc.; substituted styrenes having a substituent (e.g. a hydroxyl group, an alkoxyl group, a carboxyl group, an acyloxy group, a halogen atom, etc.) on the benzene ring such as hydroxystyrene, tert-butoxystyrene, vinylbenzoic acid, vinylbenzyl acetate, o-chlorostyrene, p-chlorostyrene, etc.; vinylbiphenyl compounds such as 4-vinylbiphenyl, 4-hydroxy-4'-vinylbiphenyl, etc.; vinyl-naphthalene compounds such as 1-vinylnaphthalene, 2-vinylnaphthalene, etc.; and so on.

The amount of each monomer is explained. When the amount of the aromatic vinyl monomer is too low, the terpolymer has a specific positive birefringence. When the amount of the aromatic vinyl monomer is too high, the photoelasticity coefficient becomes too large. When the amount of the cyclic olefinic monomer is too low, the terpolymer has a low glass transition temperature. When the amount of the cyclic olefinic monomer is too high, the terpolymer becomes fragile. Therefore, the terpolymer preferably comprises 5 to 50% by mole of the aromatic vinyl monomer and 50 to 95% by mole of the olefinic monomers, that is, the mixture of the acyclic olefinic monomer and the cyclic olefinic monomer.

For example, when a terpolymer comprises ethylene as an acyclic olefinic monomer, styrene as an aromatic vinyl monomer and tetracyclo[4.4.0.1$^{2,5}$.1$^{7,10}$]-3-dodecene as a cyclic olefinic monomer, styrene and teLracyclo[4.4.0.1$^{2,5}$.1$^{7,10}$]-3-dodecene are preferably contained in amounts of 15 to 25% by mole and 25 to 35% by mole, respectively. Thereby, the terpolymer exhibits the negative birefringence and has a high glass transition temperature and low photoelasticity.

When a high glass transition temperature and low photoelasticity are taken into account, another preferable example of a copolymer having a specific negative birefringence is a copolymer comprising N-phenylmaleimide units and α-olefin units. Such a copolymer comprises the following repeating units of the formulae (I) and (II):

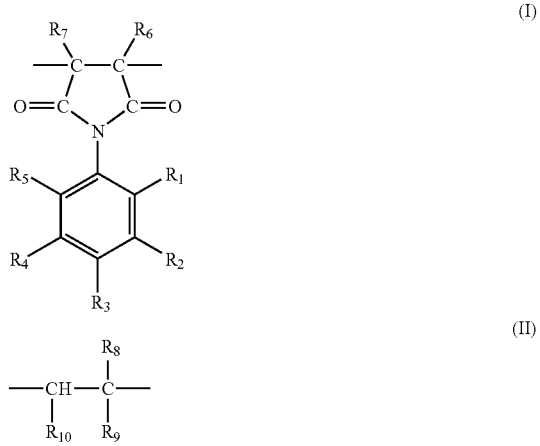

wherein $R_1$, $R_2$, $R_3$, $R_4$, $R_5$, $R_6$ and $R_7$ in the formula (I) independently represent a hydrogen atom, a halogen atom, a carboxyl group or an alkyl group having 1 to 8 carbon atoms; and $R_8$, $R_9$ and $R_{10}$ in the formula (II) independently represent a hydrogen atom or an alkyl group having 1 to 6 carbon atoms.

The formula (I) represents a N-phenylmaleimide repeating unit, and $R_1$, $R_2$, $R_3$, $R_4$ and $R_5$ on the benzene ring independently represent a hydrogen atom, a halogen atom, a carboxyl group (—COOH) or an alkyl group having 1 to 8 carbon atoms. When either one of $R_1$, $R_2$, $R_3$, $R_4$ and $R_5$ is an halogen atom, the halogen atom may be a fluorine atom, a chlorine atom, a bromine atom or an iodine atom. When either one of $R_1$, $R_2$, $R_3$, $R_4$ and $R_5$ is an alkyl group, the alkyl group has 1 to 8 carbon atoms, and it may be a linear alkyl group. When the alkyl group has 3 or more carbon atoms, it may be a branched alkyl group such as isopropyl, isobutyl, sec-butyl, tert-butyl, etc. Preferably, at least one of $R_1$, $R_2$, $R_3$, $R_4$ and $R_5$ on the benzene ring is a substituent other than a hydrogen atom. More preferably, one or two of $R_1$, $R_2$, $R_3$, $R_4$ and $R_5$ are alkyl groups, while the rest groups are hydrogen atoms. In particular, $R_1$ on the 2-position and/or $R_5$ on the 6-position are preferably alkyl groups.

In the formula (II), $R_6$ and $R_7$ on the carbon atoms of the maleimide structure independently represent a hydrogen atom, a halogen atom, a carboxyl group (—COOH) or an alkyl group having 1 to 8 carbon atoms. To the halogen atom and the alkyl group, the above explanations of the halogen atom and the alkyl group also applies. Advantageously, $R_6$ and $R_7$ on the carbon atoms of the maleimide structure are hydrogen atom, although they may be halogen atoms or carboxyl groups, which are polar groups.

The formula (II) represents an α-olefin unit, and $R_6$, $R_9$ and $R_{10}$ in this unit independently represent a hydrogen atom or an alkyl group having 1 to 6 carbon atoms. To the alkyl group, the above explanation of the alkyl group except the number of the carbon atoms also applies. Among the α-olefin which forms the repeating unit of the formula (II), one having at least 4 carbon atoms and alkyl groups as $R_8$ and $R_9$ is preferable.

Examples of a compound which forms the N-phenylmaleimide unit of the formula (I) include N-phenylmaleimide, N-(2-, 3- or 4-methylphenyl)maleimide, N-(2-, 3- or 4-ethylphenyl) maleimide, N-(2-isopropylphenyl)maleimide, N-(2,6-dimethyiphenyl)maleimide, N-(2,6-diethylphenyl) maleimide, N-(2,6-diisoproylphenyl)maleimide, N-(2,4,6-trimethylphenyl)maleimide, N-(2-, 3- or 4-carboxyphenyl) maleimide, N-(2, 4-dimethylphenyl) maleimide, etc. They may be used independently or in admixture of two or more of them.

Examples of the compound forming the α-olefin unit of the formula (II) include isobutene, 2-methyl-1-butene, 2-methyl-1-pentene, 2-methyl-1-hexene, 2-methyl-1-octene, 2-ethyl-1-pentene, 2-methyl-2-butene, 2-methyl-2-pentene, 2-methyl-2-hexene, ethylene, propylene, 1-butene, 2-buene, 1-hexene, etc. These compounds may be used independently or in admixture of two or more of them.

The N-phenylmaleimide/α-olefin copolymer having the specific negative birefringence can be prepared by copolymerizing the compound which forms the N-phenylmaleimide unit of the formula (I) and the compound which forms the α-olefin unit of the formula (II) by a conventional polymerization method. In this case, other vinyl monomer may be copolymerized in a small amount such that the specific negative birefringence of the resulting copolymer is not impaired. Examples of the other vinyl monomer include styrene, α-methylstyrene, vinyltoluene, etc.

The amount of each monomer of the N-phenylmaleimide/α-olefin copolymer is explained. When the amount of N-phenylmaleimide is too low, the copolymer exhibits a specific positive birefringence and also has a low glass transition temperature. When the amount of N-phenylmaleimide is too high, the copolymer has a large photoelasticity coefficient and becomes fragile. Accordingly, the copolymer preferably comprises 5 to 50% by mole of the N-phenylmaleimide units and 50 to 95% by mole of the α-olefin units. To prevent the decrease of the glass transition temperature of the copolymer, an N-alkylmaleimide may be copolymerized in an amount that the optical characteristics of the copolymer are not impaired.

The retardation plate can be produced by stretching the film of the polymer explained above by a suitable stretching method. To obtain the retardation plate having less fluctuation of retardation, it is important to stretch an optically uniform polymer film. For the production of a polymer film, various methods such as a melt extrusion method, a solution casting method, an inflation method, etc. are known. Any of these conventional methods may be used as long as the film has the small fluctuation of a thickness, the small fluctuation of the retardation and optical isotropy.

The film obtained by the above method is oriented by a conventional stretching method to impart the uniform retardation to the film. The stretching method may be uniaxial stretching in a machine or transverse direction, or biaxial stretching. When the optical uniaxiality of the retardation film is important, the film is uniaxially stretched with leaving the film edges free.

The retardation plate produced as described above has the following refractive index relationship:

$$n_x \approx n_z > n_y, \text{ or } n_z > n_x > n_y.$$

That is, the retardation plate has the negative uniaxiality or the maximum refractive index in the thickness direction. Thus, such a retardation plate can be preferably used to compensate the viewing angle characteristics of the liquid crystal display which utilizes the IPS mode for operation.

Next, the production of the retardation plate by the formation of a layer of the liquid crystal discotic compound is explained.

The liquid crystal discotic compound is a compound exhibiting the liquid crystal property and having a disk-like molecular structure. Thus, this compound itself has refractive indices satisfying the relationship of $n_x \approx n_z > n_y$. To achieve such a relationship of the refractive indices, the liquid crystal discotic compound in the molten form or in the form of a solution in a suitable solvent is applied on a substrate made of a transparent plastic film, oriented so that the planes of the disk-like molecules are at right angles to the substrate plane and are directed in specific direction, that is, the disks stand erect on the substrate surface and the planes of the disks face the specific direction, and then the discotic compound is solidified or the solvent is removed. The resulting layer of the liquid crystal discotic compound satisfies the relationship of $n_x \approx n_z > n_y$. Accordingly, the retardation plate having the refractive indices satisfying the relationship of $n_x \approx n_z > n_y$ can be produced by the method described above.

Any conventional method may be used to orient the molecules in the liquid crystal discotic compound. For example, the use of an orientation film, rubbing, the addition of a chiral dopant, light irradiation, etc. may be employed. Furthermore, the liquid crystal discotic compound maybe cured to fix the orientation after orienting the liquid crystal compound.

As shown in FIGS. 4A and 6A, an adhesive or tackifier 75 is preferably used to laminate the retardation plate 40 or 50 and the polarizing plate 20 or 30, and the liquid crystal cell substrate 11 or 12 and the retardation plate 40 or 50. As the tackifier, a transparent tackifier such as an acrylic tackifier is preferably used.

When the retardation plate is produced by stretching the film of the polymer having the specific negative birefringence in the transverse direction with supplying the film in a rolled form, the flow direction of the film conforms with the retarded phase axis. Therefore, when such a retardation plate is laminated on the polarizing plate, which is also produced in the rolled form and has an absorption axis in the flow direction, via roll-to-roll, a laminate product in which the retarded phase axis of the retardation plate and the absorption axis of the polarizing plate are in parallel with each other can be obtained. When the film of the polymer having the specific negative birefringence is stretched in the machine direction while supplying the film in the rolled form, the direction perpendicular to the flow direction of the film conforms with the retarded phase axis. Therefore, when such a retardation plate is laminated on the polarizing plate, which is also produced in the rolled form, via roll-to-roll, a laminate product in which the retarded phase axis of the retardation plate and the absorption axis of the polarizing plate are at right angles to each other can be obtained. When the retardation plate is produced by forming the layer of the liquid crystal discotic compound on the substrate film, it can be laminated on the polarizing plate by the roll-to-roll method. When the retardation plate and the polarizing plate are laminated by the roll-to-roll method, the number of process steps is decreased, and thus the laminate product can be efficiently produced. When the polarizing plate has a protective polymer film on one surface thereof and the retardation plate is directly adhered to the surface of the polarizing plate having no protective film, the adhered retardation plate can serves as a protective film.

Hereinafter, the present invention will be illustrated by the following examples, which do not limit the scope of the present invention in any way.

EXAMPLE 1

A retardation plate and an iodine-based linear polarizing plate were adhered in this order to the back face of an IPS mode liquid crystal cell (a liquid crystal monitor manufactured by EIZO NANAO CORPORATION), while only an iodine-based linear polarizing plate was adhered to the front face of the IPS mode liquid crystal cell to produce a liquid crystal display of this Example.

A uniaxially stretched polystyrene film having a specific negative birefringence and an in-plane retardation of 150 nm was used as the retardation plate, and "SRW 842 AP1" (manufactured by Sumitomo Chemical Co., Ltd.) was used as the iodine-based linear polarizing plate. The retardation plate was arranged such that the retarded phase axis thereof was in parallel with the transmission axis of the linear polarizing plate on the back face side and also with the major axis direction of the liquid crystal molecules in the liquid crystal cell, while the linear polarizing plates on the front face and on the back face were arranged such that their transmission axes were at right angles to each other. The relationship of the axes of the layers constituting the liquid crystal display of this Example is shown in FIG. 4B.

A backlight was provided on the rear side of the liquid crystal display, and the viewing angle dependency of this display was measured with a viewing angle-dependent luminance meter ("EZ-Contrast" manufactured by ELDIM). The viewing angle dependency was evaluated by light leakage depending on the change of viewing angles in the state of displaying black in the absence of any applied voltage. The result is shown in FIG. 10.

Figure 10:
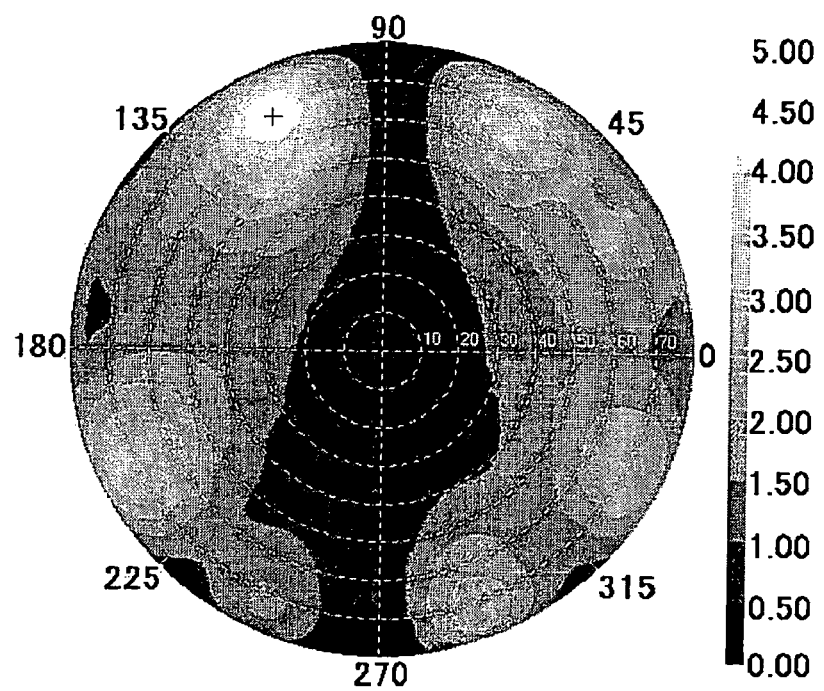
FIG. 10 shows the distribution of luminance of a liquid crystal display produced in Example 1 in the state of displaying black in the absence of applied voltage.
Figure 11:
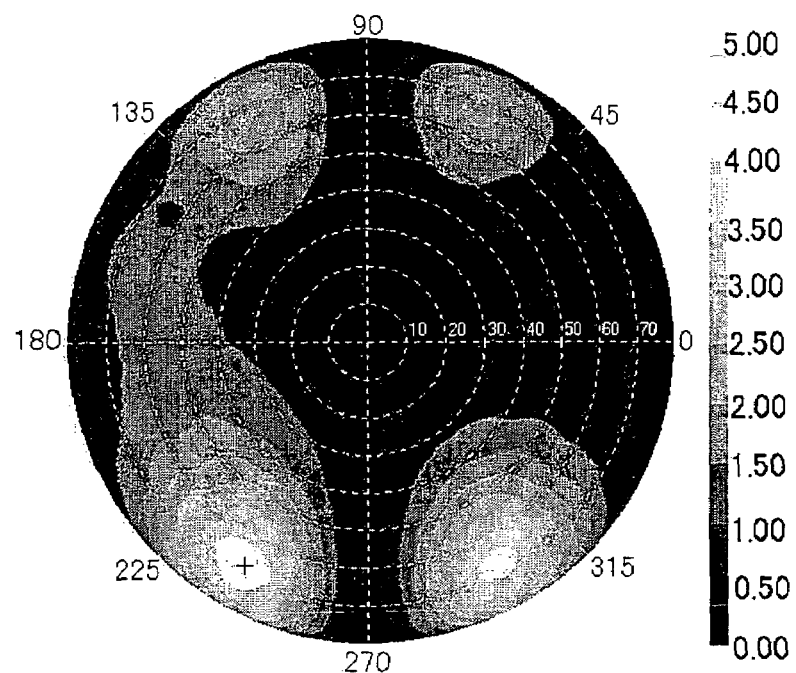
FIG. 11 shows the distribution of luminance of a liquid crystal display produced in Example 2 in the state of displaying black in the absence of applied voltage.
Figure 12:
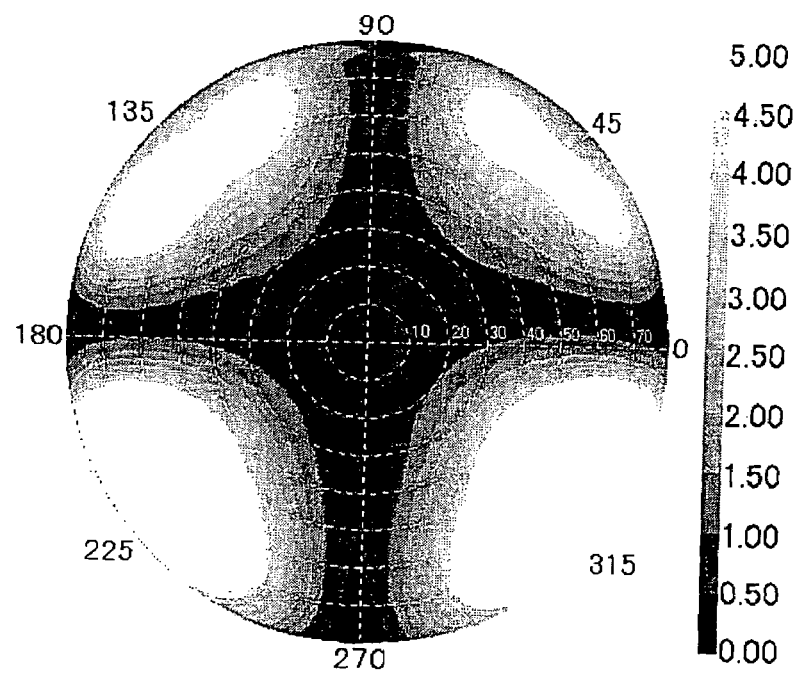
FIG. 12 shows the distribution of luminance of a liquid crystal display produced in Comparative Example 4 in the state of displaying black in the absence of applied voltage.
Figure 13:
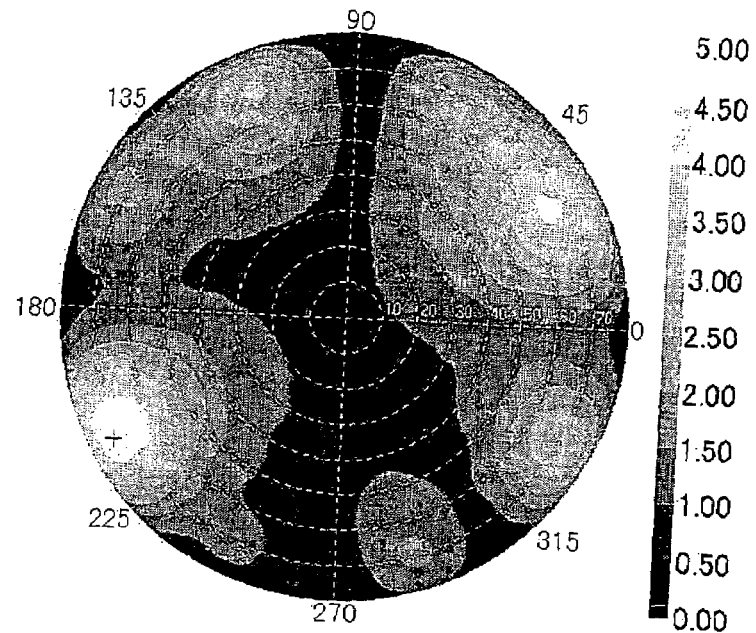
FIG. 13 shows the distribution of luminance of a liquid crystal display produced in Comparative Example 5 in the state of displaying black in the absence of applied voltage.

FIG. 10 shows the distribution of luminance of the liquid crystal display of this Example in the above state. The right-side axis corresponds to 0° (zero degree) of a direction angle, and the direction angle increases in a counterclockwise rotation from the zero degree. The degrees are indicated every 45 degrees from 0° to 315°. The figures "10", "20", - - -, "70" on the abscissa indicate the oblique angles from the normal line in each direction angle. For example, the point on the extreme right of the circle indicates the luminance at a direction angle of 0° in the direction deviating by 80° from the normal line. The scale on the right side of the luminance circle indicates the degrees of luminance. The dark color (black) means that the luminance is low and thus the corresponding surface area of the liquid crystal display is dark, that is, no light leakage occurs, while the bright color (white) means that the corresponding surface area of the liquid crystal display is bright, that is, the light leakage occurs. The mark "+" indicates the brightest point having the largest light leakage. FIGS. 11, 12 and 13 show the distributions of luminance of different liquid crystal displays. It is confirmed from FIG. 10 that the liquid crystal display of Example 1 had little light leakage in the front direction and also in the oblique directions.

EXAMPLE 2

A liquid crystal display of this Example was produced in the same manner as in Example 1 except that a uniaxially stretched polystyrene film having an in-plane retardation of 200 nm was used as a retardation plate, and then the viewing angle dependency was measured in the same manner as in Example 1. The results are shown in FIG. 11, which confirms that the liquid crystal display of Example 2 had little light leakage in the front direction and also in the oblique directions.

EXAMPLE 3

A terpolymer of ethylene, styrene and tetracyclo-[4.4.0.1$^{2,5}$.1$^{7,10}$]-3-dodecene in a molar ratio of 50:20:30 was press molded to obtain a film having a thickness of 100 μm. This film was uniaxially stretched with an autograph to give a retardation plate having a specific negative birefringence and an in-plane retardation of 140 nm. A liquid crystal display of this Example was produced in the same manner as in Example 1 except that the retardation plate produced in the above was used in place of the uniaxially stretched polyester film, and then the viewing angle dependency was measured in the same manner as in Example 1. The results were substantially the same as those obtained in Example 1, and it was confirmed that the liquid crystal display of Example 3 had little light leakage in the front direction and also in the oblique directions.

COMPARATIVE EXAMPLE 1

Figure 7:
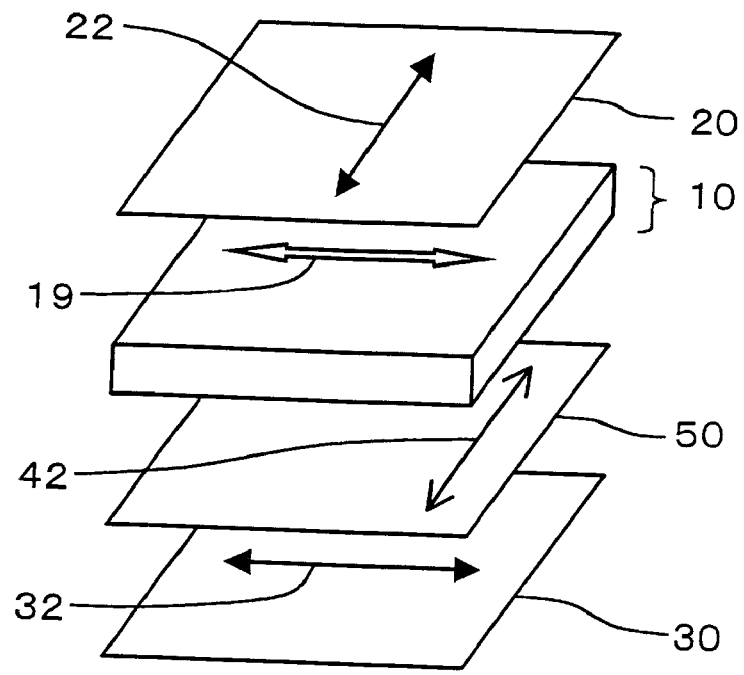
FIG. 7 is a perspective view showing the structure of a liquid crystal display produced in Comparative Example 1 and the relationships of the axes of the layers.

A liquid crystal display of this Comparative Example was produced in the same manner as in Example 1 except that the retardation plate 40 was arranged such that the retarded phase axis 42 thereof was at the right angles to the major axis direction 19 of the liquid crystal molecules in the liquid crystal cell 10 as shown in FIG. 7, and then the viewing angle dependency was measured in the same manner as in Example 1. As a result, the light leakage due to the change of viewing angles was remarkable.

COMPARATIVE EXAMPLE 2

Figure 8:
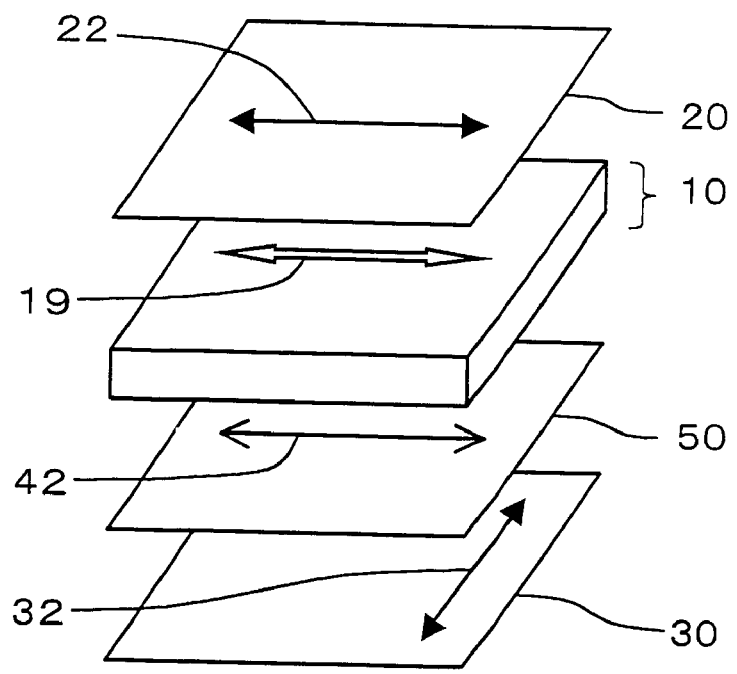
FIG. 8 is a perspective view showing the structure of a liquid crystal display produced in Comparative Example 2 and the relationships of the axes of the layers.

A liquid crystal display of this Comparative Example was produced in the same manner as in Example 1 except that the linear polarizing plate 30, which was adjacent to the retardation plate 40, was arranged such that the transmission axis 32 of the polarizing plate 30 was at the right angles to the major axis direction 19 of the liquid crystal molecules in the liquid crystal cell 10 as shown in FIG. 8, and then the viewing angle dependency was measured in the same manner as in Example 1. As a result, the light leakage due to the change of viewing angles was remarkable like the liquid crystal display of Comparative Example 1.

COMPARATIVE EXAMPLE 3

Figure 9:
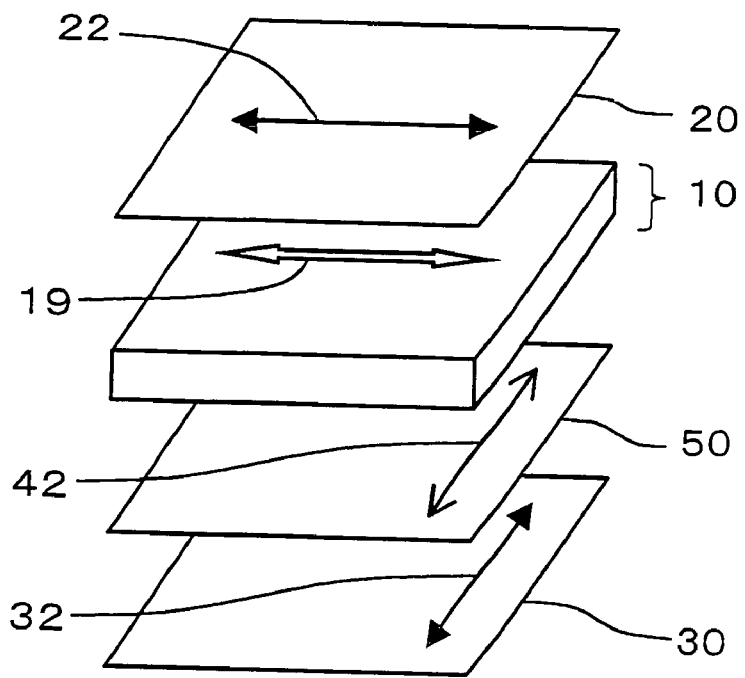
FIG. 9 is a perspective view showing the structure of a liquid crystal display produced in Comparative Example 3 and the relationships of the axes of the layers.

A liquid crystal display of this Comparative Example was produced in the same manner as in Example 1 except that the retardation plate 40 and the linear polarizing plate 30 adjacent to the retardation plate 40 were arranged such that the retarded phase axis 42 of the retardation plate 40 and the transmission axis 32 of the polarizing plate 30 were in parallel with each other and the both axes 42 and 32 were at right angles to the major axis direction 19 of the liquid crystal molecules in the liquid crystal cell as shown in FIG. 9, and then the viewing angle dependency was measured in the same manner as in Example 1. As a result, the light leakage due to the change of viewing angles was remarkable like the liquid crystal displays of Comparative Examples 1 and 2.

COMPARATIVE EXAMPLE 4

A liquid crystal display of this Comparative Example was produced in the same manner as in Example 1 except that no retardation plate was used, and then the viewing angle dependency was measured in the same manner as in Example 1. The results are shown in FIG. 12. The light leakage in the front direction was small, but the light leakage in the oblique directions was large. That is, the liquid crystal display of this Comparative Example had the large viewing angle dependency.

COMPARATIVE EXAMPLE 5

As a retardation plate oriented in its thickness direction, "SEZ 270135" (manufactured by Sumitomo Chemical Co., Ltd.) was provided. This retardation plate is made of polycarbonate and has an in-plane retardation of 135 nm and a Nz value of 0.2.

A liquid crystal display of this Comparative Example was produced in the same manner as in Example 1 except that the above retardation plate was used in place of the uniaxially stretched polystyrene film, and then the viewing angle dependency was measured in the same manner as in Example 1. The results are shown in FIG. 13. The light leakages in the front and oblique directions were both relatively small, but the maximum light leakage in Example 1 was smaller than that in this Comparative Example. Furthermore, the viewing angle range in which the light leakage occurred in Example 2 was smaller than that in this Comparative Example.

The constructions and properties of the liquid crystal displays of Examples 1-3 and Comparative Examples 1-5 and also the results of the measurements of viewing angle dependency are summarized in Table 1.

TABLE 1

| Example No. | Retardation Plate | In-plane retardation | Nz value | Arrangement[4] | Arrangement[5] | Light leakage[6] |
|---|---|---|---|---|---|---|
| Ex. 1 | PS[1] | 150 nm | 0 | Parallel | Parallel | A |
| Ex. 2 | PS[1] | 200 nm | 0 | Parallel | Parallel | A |
| Ex. 3 | Terpolymer[2] | 140 nm | 0 | Parallel | Parallel | A |
| C. Ex. 1 | PS[1] | 150 nm | 0 | Right angles | Parallel | C |
| C. Ex. 2 | PS[1] | 150 nm | 0 | Parallel | Right angles | C |
| C. Ex. 3 | PS[1] | 150 nm | 0 | Right angles | Right angles | C |
| C. Ex. 4 | None | — | — | — | — | C |
| C. Ex. 5 | PC[3] | 135 nm | 0.2 | Parallel | Parallel | B |

Notes:
[1] Polystyrene.
[2] Terpolymer of ethylene, styrene and tetracyclo-[$4.4.0.1^{2,5}.1^{7,10}$]-3-dodecene.
[3] Polycarbonate.
[4] The arrangement of the retarded phase axis and the major axes of the liquid crystal molecules.
[5] The arrangement of the transmission axis of the polarizing plate adjacent to the retardation plate and the major axes of the liquid crystal molecules.
[6] A: Good (no light leakage) B: Almost good but slight light leakage in the oblique direction; C: Light leakage in the oblique direction

EXAMPLE 4

Figure 14:
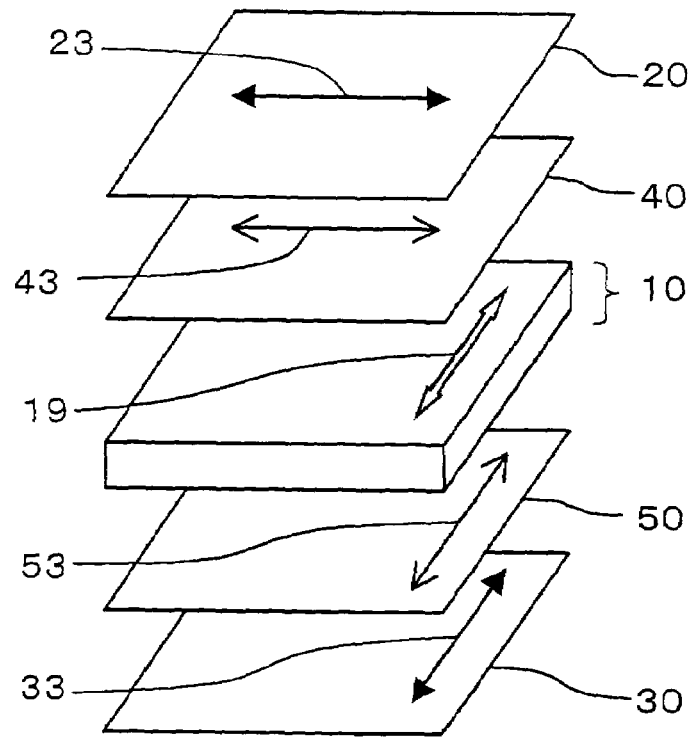
FIG. 14 is a perspective view showing the structure of each of liquid crystal displays produced in Examples 4-6 and 8 and the relationships of the axes of the layers.

As shown in FIG. 14 in which the layers are separately depicted for easy reference, the first retardation plate 40 and the iodine-based linear polarizing plate 20 were adhered in this order to the front face of an IPS mode liquid crystal display (a liquid crystal display installed in a liquid crystal television "W17-LC50" manufactured by Hitachi Limited), and the second retardation plate 50 and the iodine-based linear polarizing plate 30 were adhered in this order to the back face of the IPS mode liquid crystal display.

A polystyrene film, which was uniaxially stretched in the machine direction and had a specific negative birefringence, an in-plane retardation of 215 nm and a Nz value of 0.0, was used as the first retardation plate 40, and a polystyrene film, which was uniaxially stretched in the machine direction and had a specific negative birefringence, an in-plane retardation of 130 nm and a Nz value of −0.1, was used as the second retardation plate 50. "SRW 842 AP0" (manufactured by Sumitomo Chemical Co., Ltd.) was used as the iodine-based linear polarizing plates 20 and 30. The first retardation plate 40 was arranged such that the retarded phase axis 43 thereof was in parallel with the transmission axis 23 of the linear polarizing plate 20 on the front face side and at right angles to the major axis direction 19 of the liquid crystal molecules in the liquid crystal cell 10, while the second retardation plate 50 was arranged such that the retarded phase axis 53 thereof was in parallel with the transmission axis 33 of the linear polarizing plate 30 on the back face side and also with the major axis direction 19 of the liquid crystal molecules in the liquid crystal cell 10. Furthermore, the linear polarizing plates 20 and 30 respectively on the front face and on the back face were arranged such that their transmission axes 23 and 33 were at right angles to each other.

Figure 17:
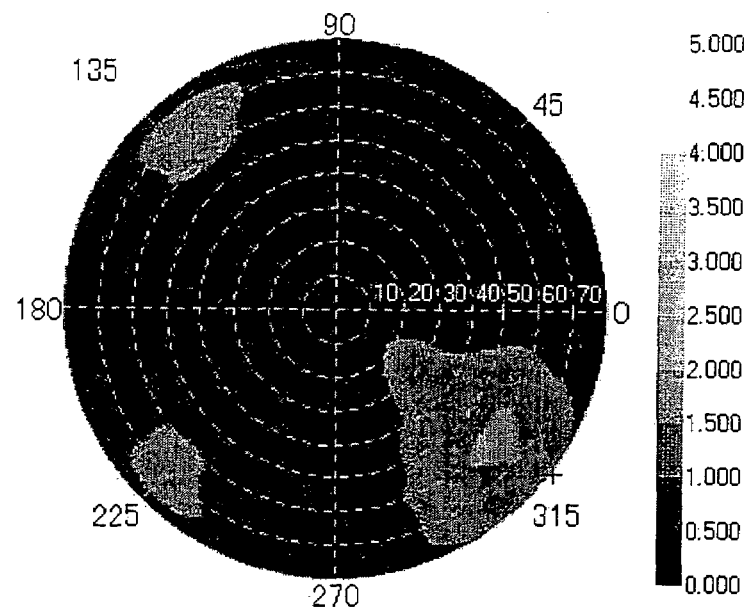
FIG. 17 shows the distribution of luminance of a liquid crystal display produced in Example 4 in the state of displaying black in the absence of applied voltage.

A backlight was provided on the rear side of the liquid crystal display, and the viewing angle dependency of this display was measured in the same manner as in Example 1. The result is shown in FIG. 17, which confirms that the liquid crystal display of Example 4 had little light leakage in the front direction and also in the oblique directions.

EXAMPLE 5

Figure 18:
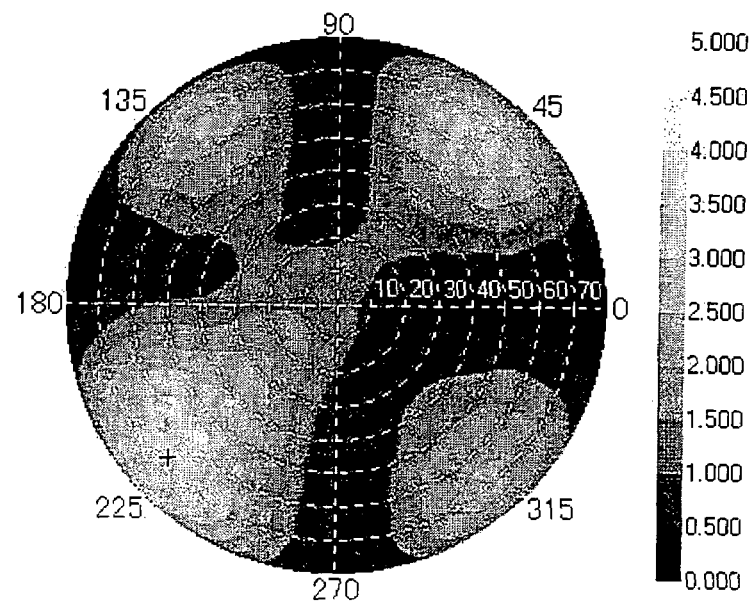
FIG. 18 shows the distribution of luminance of a liquid crystal display produced in Example 5 in the state of displaying black in the absence of applied voltage.

A liquid crystal display or this Example was produced in the same manner as in Example 4 except that a polystyrene film, which was uniaxially stretched in the machine direction and had an in-plane retardation of 268 nm and a Nz value of 0.0, was used as the first retardation plate, while a polystyrene film, which was uniaxially stretched in the machine direction and had an in-plane retardation of 135 nm and a Nz value of −0.1, was used as the second retardation plate, and then the viewing angle dependency was measured in the same manner as in Example 1. The results are shown in FIG. 18, which confirms that the liquid crystal display of Example 5 had little light leakage in the front direction and also in the oblique directions.

EXAMPLE 6

A copolymer of ethylene, styrene and tetracyclo[$4.4.0.1^{2,5}.1^{7,10}$]-3-dodecene in a molar ratio of 48:22:30 was press molded to obtain a film having a thickness of 150 μm. This film was uniaxially stretched in the machine direction to give one retardation plate having a specific negative birefringence, in-plane retardation of 201 nm and a Nz value of 0.0 and another retardation plate having a specific negative birefringence, in-plane retardation of 131 nm and a Nz value of −0.1.

Then, a liquid crystal display of this Example was produced in the same manner as in Example 4 except that the retardation plate having an in-plane retardation of 201 nm was used as the first retardation plate and one having an in-plane retardation of 131 nm was used as the second retardation plate, and then the viewing angle dependency was measured in the same manner as in Example 1. The results were substantially the same as those obtained in Example 4, and it was confirmed that the liquid crystal display of Example 6 had little light leakage in the front direction and also in the oblique directions.

EXAMPLE 7

A polystyrene film which was uniaxially stretched in the machine direction and had an in-plane retardation of 214 nm and a Nz value of 0.0 and another polystyrene film which was uniaxially stretched in the machine direction and had an in-plane retardation of 134 nm and a Nz value of −0.1 were provided as the first and second retardation plates, respectively.

Figure 15:
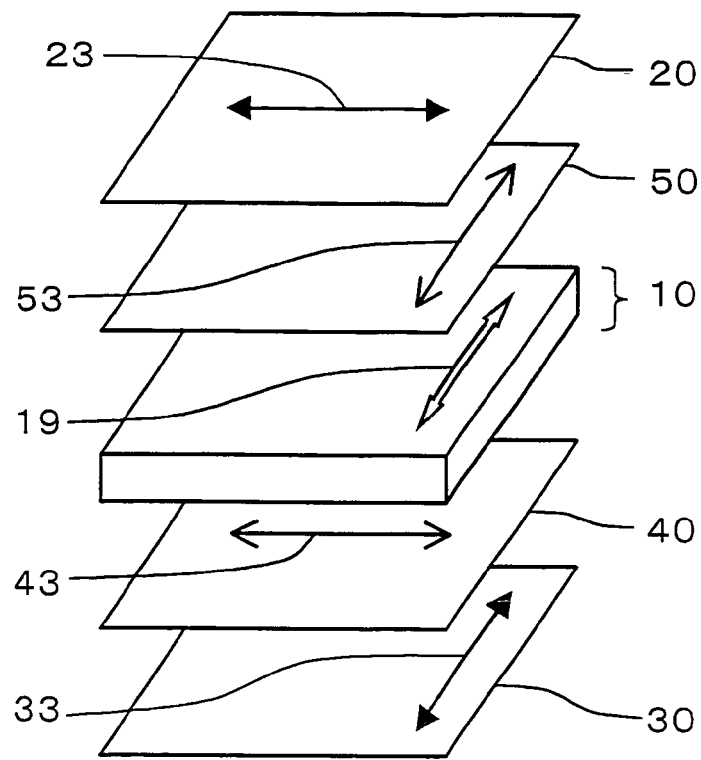
FIG. 15 is a perspective view showing the structure of a liquid crystal display produced in Example 7 and the relationships of the axes of the layers.

As shown in FIG. 15 in which the layers are separately depicted for easy reference, the second retardation plate 50 and the iodine-based linear polarizing plate 20 were adhered in this order to the front face of the same IPS mode liquid crystal display as one used in Example 4, and the first retardation plate 40 and the iodine-based linear polarizing plate 30 were adhered in this order to the back face of the IPS mode liquid crystal display to produce a liquid crystal display of this Example. The iodine-based linear polarizing plates 20 and 30 were the same as one used in Example 4.

Figure 19:
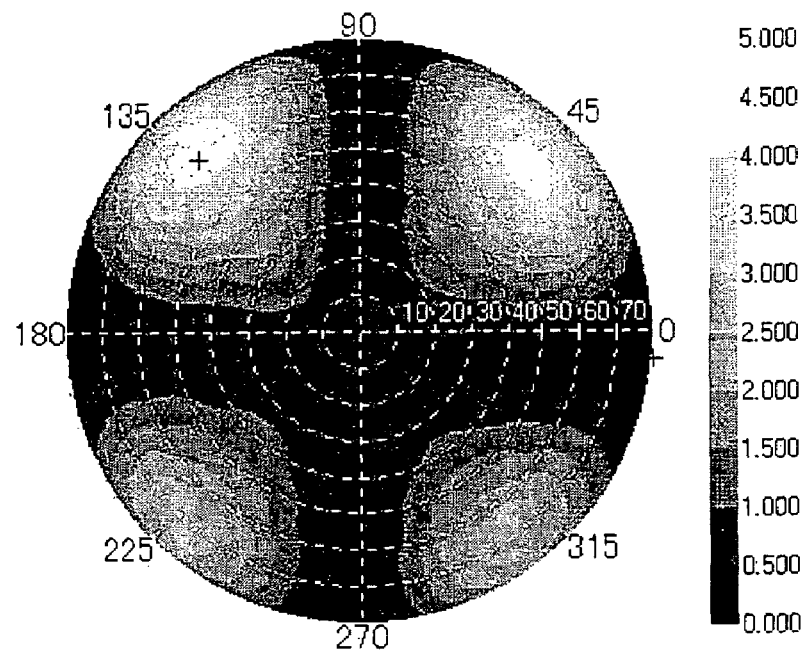
FIG. 19 shows the distribution of luminance of a liquid crystal display produced in Example 7 in the state of displaying black in the absence of applied voltage.

In this Example, the second retardation plate 50 was arranged such that the retarded phase axis 53 thereof was at right angles to the absorption axis 23 of the linear polarizing plate 20 on the front face side and in parallel with the major axis direction 19 of the liquid crystal molecules in the liquid crystal cell 10, while the first retardation plate 40 was arranged such that the retarded phase axis 43 thereof was in parallel with the absorption axis 33 of the linear polarizing plate 30 on the back face side and also with the major axis direction 19 of the liquid crystal molecules in the liquid crystal cell 10. The linear polarizing plates 20 and 30 were arranged such that their absorption axes 23 and 33 were at right angles to each other. With the liquid crystal display produced, the viewing angle dependency was measured in the same manner as in Example 1. The results are shown in FIG. 19, and it was confirmed that the liquid crystal display of Example 7 had good viewing angle characteristics although it had slight light leakage in the oblique directions.

EXAMPLE 8

Figure 20:
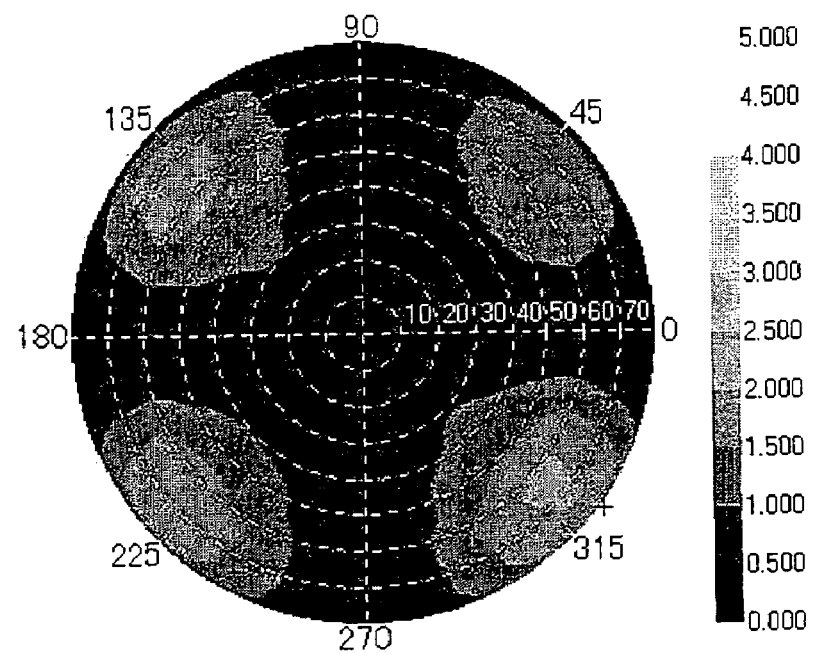
FIG. 20 shows the distribution of luminance of a liquid crystal display produced in Example 8 in the state of displaying black in the absence of applied voltage.

A liquid crystal display of this Example was produced in the same manner as in Example 4 except that a polystyrene film, which was uniaxially stretched in the transverse direction and had a specific negative birefringence, an in-plane retardation of 165 nm and a Nz value of −0.5, was used as the first retardation plate, and a polystyrene film, which was uniaxially stretched in the transverse direction and had a specific negative birefringence, an in-plane retardation of 106 nm and a Nz value of −0.5, was used as the second retardation plate, and then the viewing angle dependency was measured in the same manner as in Example 1. The results are shown in FIG. 20, which confirms that the liquid crystal display of Example 8 had little light leakage in the front direction and also in the oblique directions.

COMPARATIVE EXAMPLE 6

Figure 21:
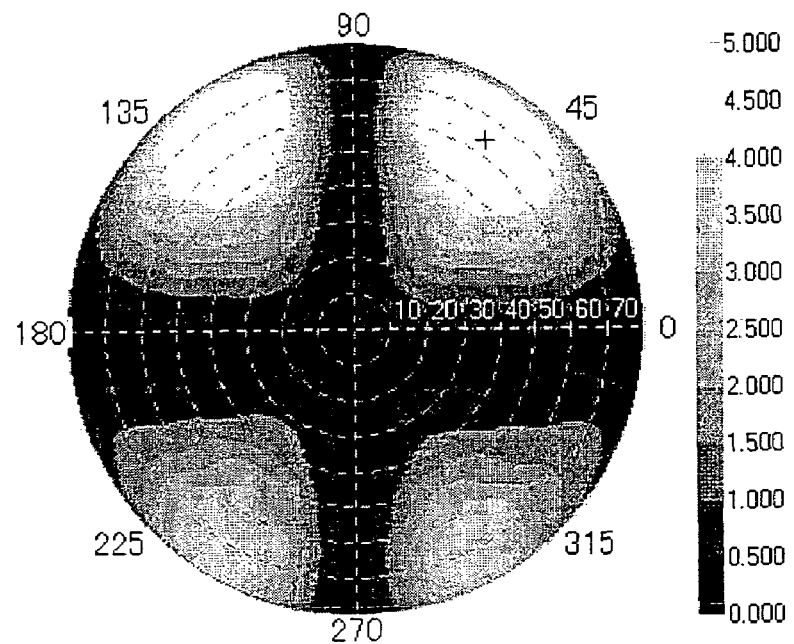
FIG. 21 shows the distribution of luminance of a liquid crystal display produced in Comparative Example 6 in the state of displaying black in the absence of applied voltage.

A liquid crystal display of this Comparative Example was produced in the same manner as in Example 1 except that no retardation plate was used, and then the viewing angle dependency was measured in the same manner as in Example 1. The results are shown in FIG. 21. The light leakage in the front direction was small, but the light leakage in the oblique directions was large. That is, the liquid crystal display of this Comparative Example had the large viewing angle dependency.

C0MPARATIVE EXAMPLE 7

As a retardation plate oriented in its thickness direction, "SEZ 270135" (manufactured by Sumitomo Chemical Co., Ltd.) was provided. This retardation plate is made of polycarbonate and has an in-plane retardation of 135 nm and a Nz value of 0.2.

Figure 16:
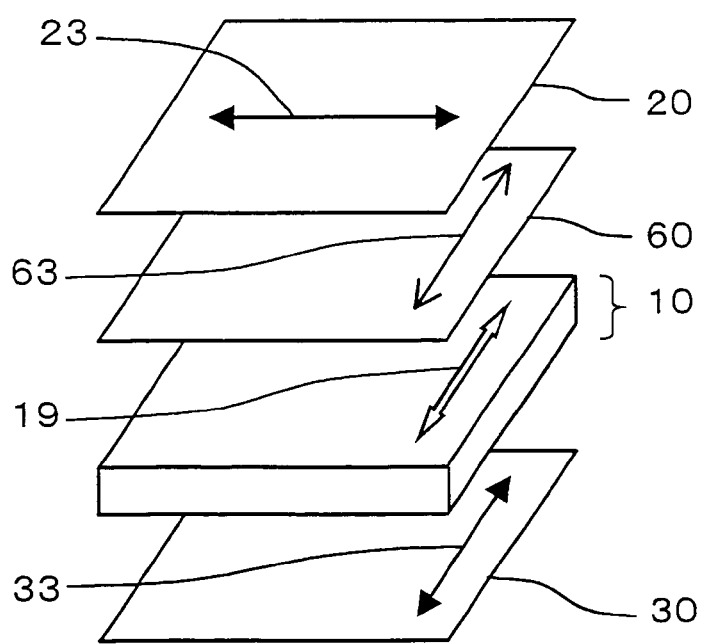
FIG. 16 is a perspective view showing the structure of each of liquid crystal displays produced in Comparative Examples 7 and 8 and the relationships of the axes of the layers.
Figure 22:
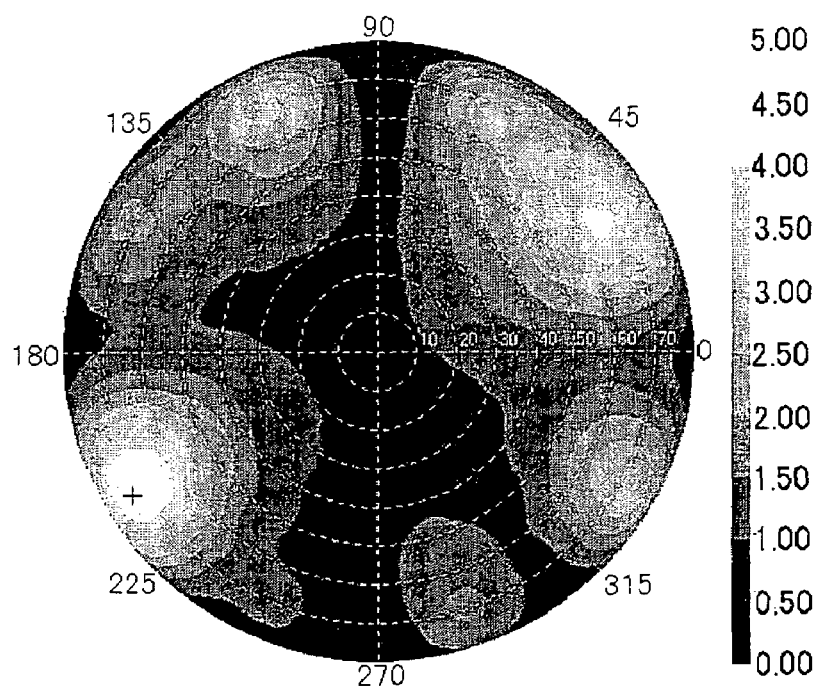
FIG. 22 shows the distribution of luminance of a liquid crystal display produced in Comparative Example 7 in the state of displaying black in the absence of applied voltage.

As shown in FIG. 16, the above retardation plate 60 of polycarbonate and the iodine-based linear polarizing plate 20 were adhered in this order to the front face of the same liquid crystal cell 10 as one used in Example 4, while only the iodine-based linear polarizing plate 30 was adhered to the back face of the liquid crystal cell 10 to produce the liquid crystal display of this Comparative Example. The retardation plate 60 was arranged such that the retarded phase axis 63 thereof was at right angles to the absorption axis 23 of the linear polarizing plate 20 on the front face side and in parallel with the major axis direction 19 of the liquid crystal molecules in the liquid crystal cell 10, and the linear polarizing plates 20 and 30 were arranged such that their absorption axes 23 and 33 were at right angles to each other. With this liquid crystal display, the viewing angle dependency was measured in the same manner as in Example 1. The results are shown in FIG. 22. The light leakage in the front direction was small, but the light leakage in the oblique directions was larger than those of the liquid crystal displays of Examples. Thus, the liquid crystal display of Comparative Example 7 had the large viewing angle dependency.

COMPARATIVE EXAMPLE 8

Figure 23:
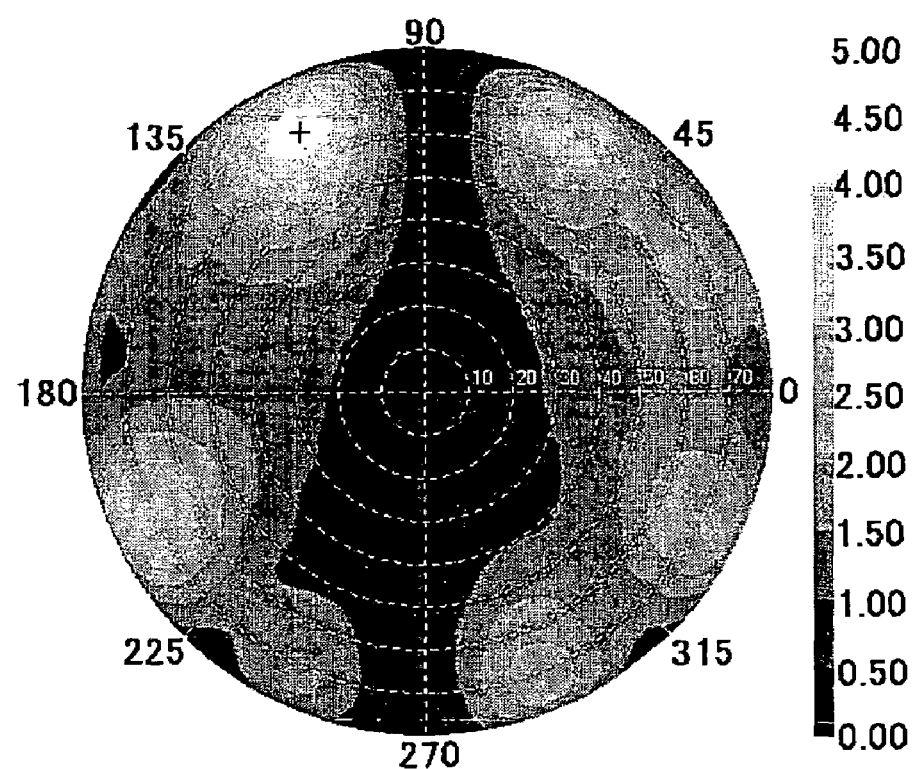
FIG. 23 shows the distribution of luminance of a liquid crystal display produced in Comparative Example 8 in the state of displaying black in the absence of applied voltage.

A liquid crystal display of this Comparative Example was produced in the same manner as in Comparative Example 7 except that a polystyrene film, which was uniaxially stretched in the transverse direction and had a specific negative birefringence, an in-plane retardation of 150 nm and a Nz value of 0.0, was used, and then the viewing angle dependency was measured in the same manner as in Example 1. The results are shown in FIG. 23. The light leakage in the front direction was small, but the light leakage in the oblique directions was larger than those of the liquid crystal displays of Examples. Thus, the liquid crystal display of Comparative Example 8 had the large viewing angle dependency.

The constructions and properties of the liquid crystal displays of Examples 4-8 and Comparative Examples 6-8 and also the results of the measurements of viewing angle dependency are summarized in Table 2.

a first polarizing plate arranged outside one of said substrates of the liquid crystal cell, a second polarizing plate arranged outside the other of said substrates of the liquid crystal cell, and at least one retardation plate placed between either one of said substrates and said polarizing plate arranged outside said substrate, wherein said at least one retardation plate has a negative uniaxiality and an optical axis in a plane direction thereof, and wherein a Nz coefficient represented by $(n_x-n_z)/(n_x-n_y)$ is from −1.0 to +0.2 where $n_x$ is a refractive index of the retardation plate in a retarded phase axis direction in the plane of the retardation plate, $n_y$ is a refractive index of the retardation plate in a direction perpendicular to the retarded phase axis direction in the plane of the retardation plate and $n_z$ is a refractive index in a thickness direction of the retardation plate; and said at least one retardation plate has an in-plane retardation of 80 to 250 nm and is arranged such that the retarded phase axis thereof is in parallel with a transmission axis of the polarizing plate adjacent to said retardation plate and also with the major axis of liquid crystal molecules present on the surface of the cell substrate adjacent to said retardation plate.

TABLE 2

|  | Example | | | | | Comparative Example | | |
|---|---|---|---|---|---|---|---|---|
|  | 4 | 5 | 6 | 7 | 8 | 6 | 7 | 8 |
| Material of retardation plate[1] | PS | PS | Terpolymer | PS | PS | — | PC | PS |
| Retardation plate on front face | | | | | | | | |
| In-plane retardation | 215 nm | 268 nm | 201 nm | 134 nm | 165 nm | — | 135 nm | 150 nm |
| Nz value | 0.0 | 0.0 | 0.0 | −0.1 | −0.5 | — | 0.2 | 0.0 |
| Relationship with absorption axis of polarizing plate | Parallel | Parallel | Parallel | Right angles | Parallel | — | Right angles | Right angles |
| Relationship with major axis of liquid crystal molecules | Right angles | Right angles | Right angles | Parallel | Right angles | — | Parallel | Parallel |
| Retardation plate on back face | | | | | | | | |
| In-plane retardation | 130 nm | 135 nm | 131 nm | 214 nm | 106 nm | — | — | — |
| Nz value | −0.1 | −0.1 | −0.1 | 0.0 | −0.5 | — | — | — |
| Relationship with absorption axis of polarizing plate | Parallel | Parallel | Parallel | Right angles | Parallel | — | — | — |
| Relationship with major axis of liquid crystal molecules | Parallel | Parallel | Parallel | Right angles | Parallel | — | — | — |
| Fig. No. showing arrangement | 14 | 14 | 14 | 15 | 14 | — | 16 | 16 |
| Light leakage[2] | A | A | A | B | A | D | C | C |
| Fig. No. showing luminance distribution | 17 | 18 | — | 19 | 20 | 21 | 22 | 23 |

Notes:
[1] PS: Polystyrene. Terpolymer: Teropolymer of ethylene, styrene and tetracyclo[4.4.0.1$^{2,5}$.1$^{7,10}$]-3-dodecene. PC: Polycarbonate.
[2] A: Good (no light leakage); B: Almost good but slight light leakage in the oblique direction; C: Light leakage in the oblique direction; D: Large light leakage in the oblique direction.

What is claimed is:

1. A liquid crystal display comprising:

a liquid crystal cell comprising a pair of substrates and a liquid crystal layer which is sandwiched between said pair of substrates and oriented substantially in parallel with said substrates in regions near said substrates in the absence of an applied voltage, 2. The liquid crystal display according to claim 1, wherein said first and second polarizing plates are arranged such that their transmission axes are at right angles to each other.

3. The liquid crystal display according to claim 1, wherein the second retardation plate is arranged such that the retarded phase axis thereof is at right angles to or in parallel with the major axis of the liquid crystal molecules present near the inner side of the cell substrate adjacent to the second retardation plate in the absence of an applied voltage.

4. The liquid crystal display according to claim 3, wherein the retarded phase axis of the second retardation plate is in parallel with the major axis of the liquid crystal molecules.

5. The liquid crystal display according to claim 1, wherein the first retardation plate is arranged such that the retarded phase axis thereof is at right angles to or in parallel with an absorption axis of the polarizing plate adjacent to the first retardation plate.

6. The liquid crystal display according to claim 5, wherein the retarded phase axis of the first retardation plate is in parallel with an absorption axis of the polarizing plate adjacent to the first retardation plate.

7. The liquid crystal display according to claim 1, wherein the second retardation plate is arranged such that the retarded phase axis thereof is at right angles to or in parallel with an absorption axis of the polarizing plate adjacent to the second retardation plate.

8. The liquid crystal display according to claim 7, wherein the retarded phase axis of the second retardation plate is in parallel with an absorption axis of the polarizing plate adjacent to the second retardation plate.

9. The liquid crystal display according to claim 1, wherein said retardation plate is a uniaxially stretched film of a polymer having a specific negative birefringence.

10. The liquid crystal display according to claim 9, wherein said polymer is a terpolymer of at least one acyclic olefinic monomer selected from the group consisting of ethylene and α-olefins having 3 to 20 carbon atoms, at least one cyclic olefinic monomer and at least one aromatic vinyl monomer, in which the amount of said aromatic monomer is from 5 to 50% by mole and the total amount of said acyclic olefinic monomer and said cyclic olefinic monomer is from 50 to 95% by mole.

11. The liquid crystal display according to claim 1, wherein said retardation plate comprises a layer of a liquid crystal discotic compound exhibiting a negative uniaxiality.

12. The liquid crystal display according to claim 1, which operates in an in-plane switching mode.

13. A liquid crystal display comprising:
a liquid crystal cell comprising a pair of substrates and a liquid crystal layer which is sandwiched between said pair of substrates and oriented substantially in parallel with said substrates in regions near said substrates in the absence of an applied voltage,
a first polarizing plate arranged outside one of said substrates of the liquid crystal cell,
a second polarizing plate arranged outside the other of said substrates of the liquid crystal cell, and
two retardation plates,
the first retardation plate of which is arranged between one polarizing plate and the corresponding cell substrate and has an in-plane retardation of 160 to 270 nm, and
the second retardation plate of which is arranged between the other polarizing plate and the corresponding cell substrate and has an in-plane retardation of 100 to 160 nm,
wherein the first retardation plate is arranged such that the retarded phase axis thereof is at right angles to the major axis of the liquid crystal molecules present near the inner side of the cell substrate adjacent to the first retardation plate in the absence of an applied voltage; and
said retardation plates have a negative uniaxiality and an optical axis in a plane direction thereof, and wherein a Nz coefficient represented by $(n_x-n_z)/(n_x-n_y)$ is from −1.0 to +0.2
where $n_x$ is a refractive index of the retardation elate in a retarded phase axis direction in the plane of the retardation plate, $n_y$ is a refractive index of the retardation elate in a direction perpendicular to the retarded chase axis direction in the plane of the retardation plate and $n_z$ is a refractive index in a thickness direction of the retardation plate.

14. The liquid crystal display according to claim 13, wherein said first and second polarizing plates are arranged such that their transmission axes are at right angles to each other.

15. The liquid crystal display according to claim 13, wherein the second retardation plate is arranged such that the retarded phase axis thereof is at right angles to or in parallel with the major axis of the liquid crystal molecules present near the inner side of the cell substrate adjacent to the second retardation plate in the absence of an applied voltage.

16. The liquid crystal display according to claim 15, wherein the retarded phase axis of the second retardation plate is in parallel with the major axis of the liquid crystal molecules.

17. The liquid crystal display according to claim 13, wherein the first retardation plate is arranged such that the retarded phase axis thereof is at right angles to or in parallel with an absorption axis of the polarizing plate adjacent to the first retardation plate.

18. The liquid crystal display according to claim 17, wherein the retarded phase axis of the first retardation plate is in parallel with an absorption axis of the polarizing plate adjacent to the first retardation plate.

19. The liquid crystal display according to claim 13, wherein the second retardation plate is arranged such that the retarded phase axis thereof is at right angles to or in parallel with an absorption axis of the polarizing plate adjacent to the second retardation plate.

20. The liquid crystal display according to claim 19, wherein the retarded phase axis of the second retardation plate is in parallel with an absorption axis of the polarizing plate adjacent to the second retardation plate.

21. The liquid crystal display according to claim 13, wherein said retardation plates are uniaxially stretched films of a polymer having a specific negative birefringence.

22. The liquid crystal display according to claim 21, wherein said polymer is a terpolymer of at least one acyclic olefinic monomer selected from the group consisting of ethylene and α-olefins having 3 to 20 carbon atoms, at least one cyclic olefinic monomer and at least one aromatic vinyl monomer, in which the amount of said aromatic monomer is from 5 to 50% by mole and the total amount of said acyclic olefinic monomer and said cyclic olefinic monomer is from 50 to 95% by mole.

23. The liquid crystal display according to claim 13, wherein said retardation plates comprise a layer of a liquid crystal discotic compound exhibiting a negative uniaxiality.

24. The liquid crystal display according to claim 13, which operates in an in-plane switching mode.

* * * * *